(12) United States Patent
Stanley et al.

(10) Patent No.: US 7,273,231 B2
(45) Date of Patent: Sep. 25, 2007

(54) SEAT BELT DEVICE

(75) Inventors: James G. Stanley, Tokyo (JP); Hiroki Takehara, Tokyo (JP)

(73) Assignee: Takata Corporation, Tokyo (JP)

( * ) Notice: Subject to any disclaimer, the term of this patent is extended or adjusted under 35 U.S.C. 154(b) by 361 days.

(21) Appl. No.: 10/743,472

(22) Filed: Dec. 23, 2003

(65) Prior Publication Data

US 2004/0135359 A1 Jul. 15, 2004

Related U.S. Application Data

(63) Continuation-in-part of application No. 10/604,319, filed on Jul. 10, 2003, now Pat. No. 7,100,944.

(60) Provisional application No. 60/394,815, filed on Jul. 10, 2002.

(51) Int. Cl.
*B60R 22/00* (2006.01)
(52) U.S. Cl. .................. 280/801.1; 73/862.541
(58) Field of Classification Search ............ 280/801.1, 280/808; 180/268; 73/862.451, 862.453, 73/862.391, 862.392, 862.396, 862.541; 297/468, 483
See application file for complete search history.

(56) References Cited

U.S. PATENT DOCUMENTS

| | | | | |
|---|---|---|---|---|
| 5,996,421 A * | 12/1999 | Husby | .................. | 73/862.451 |
| 6,301,977 B1 * | 10/2001 | Stojanovski | ........... | 73/862.393 |
| 6,481,750 B1 * | 11/2002 | Kalina et al. | ............ | 280/801.1 |
| 6,725,727 B2 * | 4/2004 | Rogers et al. | ................. | 73/779 |
| 6,729,428 B2 * | 5/2004 | Jitsui | .......................... | 180/268 |
| 6,746,048 B2 * | 6/2004 | Tajima et al. | ............ | 280/801.1 |
| 6,851,503 B2 * | 2/2005 | Almaraz et al. | ............ | 180/268 |

FOREIGN PATENT DOCUMENTS

| JP | 2002-206976 A | 7/2002 |
|---|---|---|
| JP | 2002-206977 A | 7/2002 |
| JP | 2002-206978 A | 7/2002 |

\* cited by examiner

*Primary Examiner*—Eric Culbreth
(74) *Attorney, Agent, or Firm*—Foley & Lardner LLP

(57) ABSTRACT

A seat belt device including an anchor connecting member configured to be connected to the vehicle body, a webbing connecting member connected to the seat belt, and a webbing passing through an opening the webbing connecting member. The webbing located in the opening is folded and constrained from unfolding by stitching extending in a direction transverse to the longitudinal direction of the webbing. The device includes a sensor mechanism that detects a force acting between the anchor connecting member and the webbing connecting member.

6 Claims, 20 Drawing Sheets

Fig. 5
Fig. 6
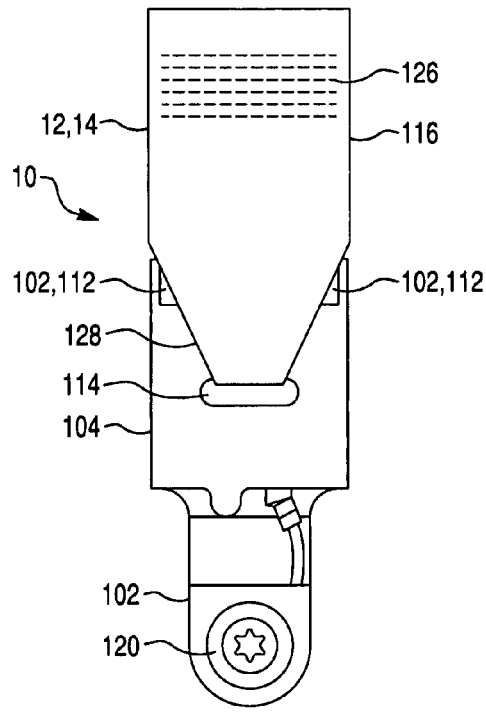
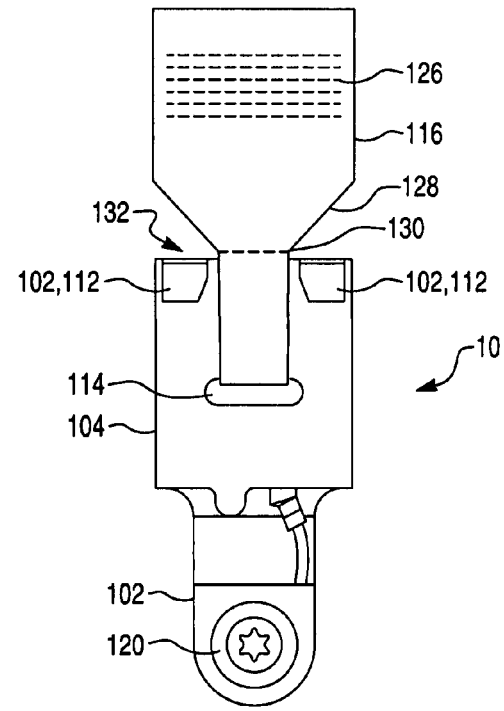
Fig. 7
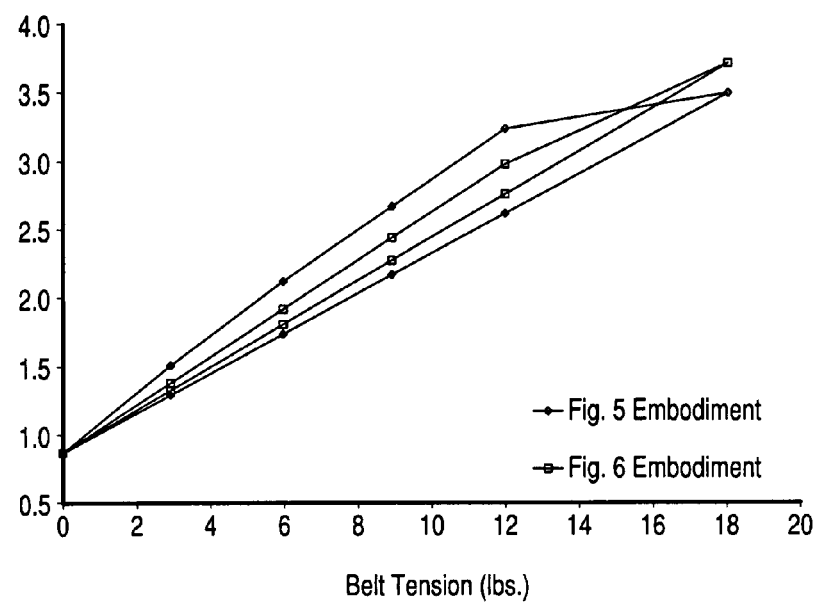

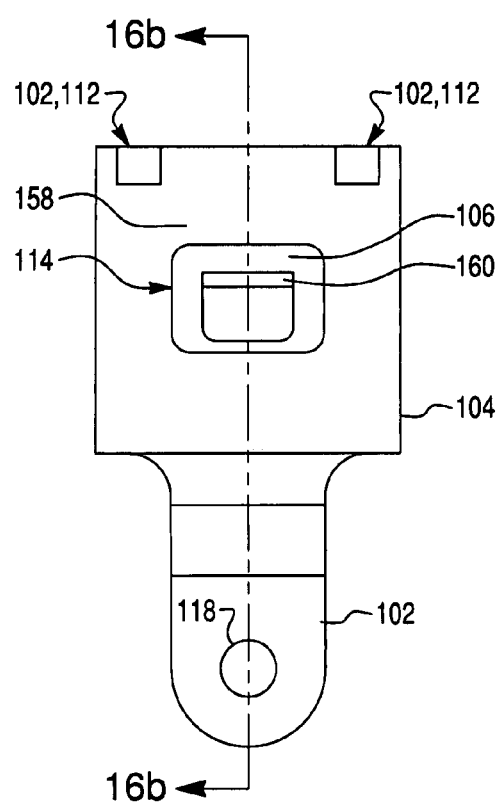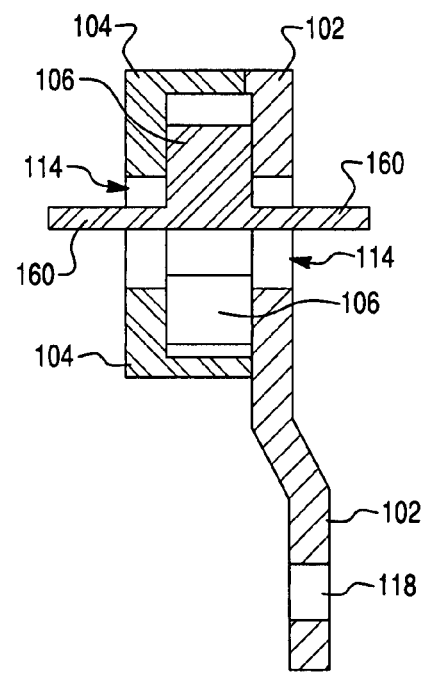

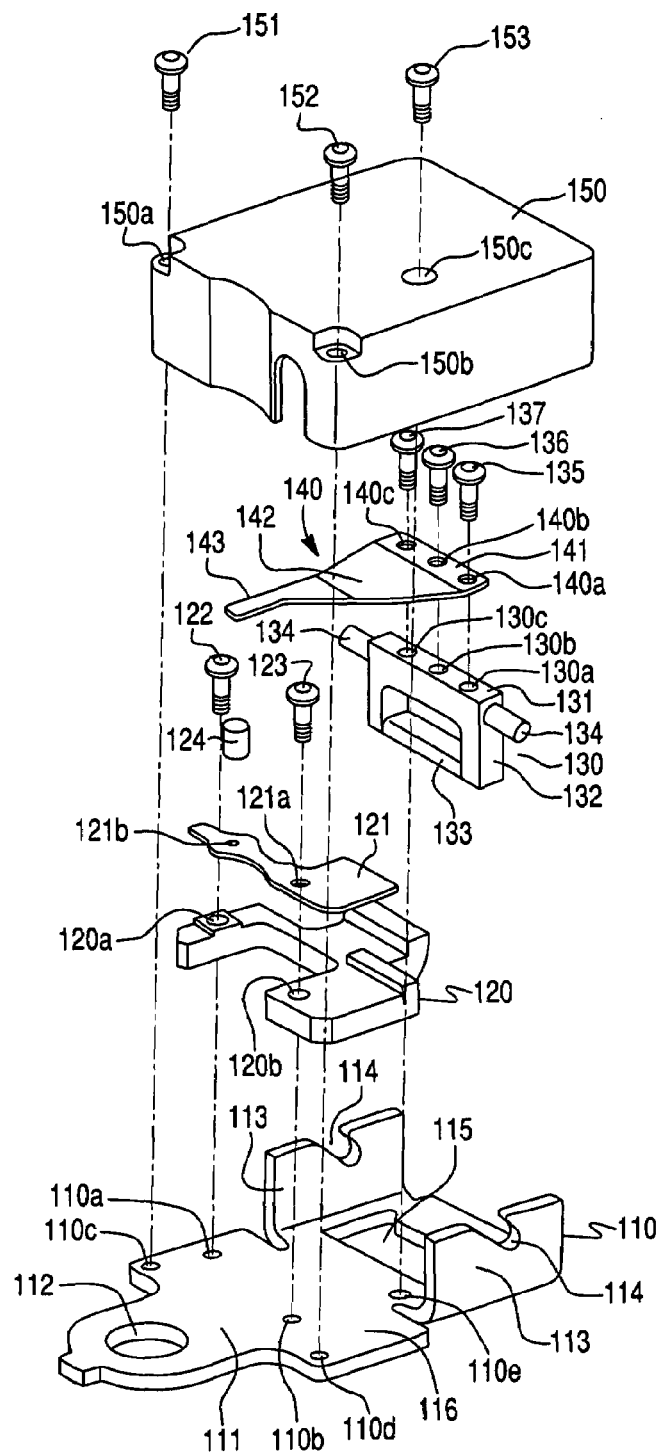

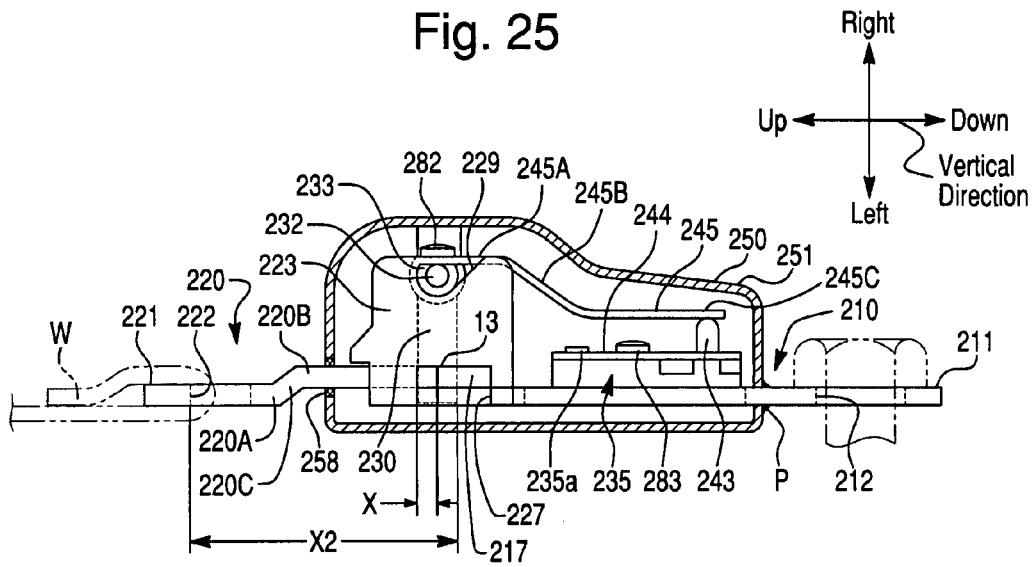
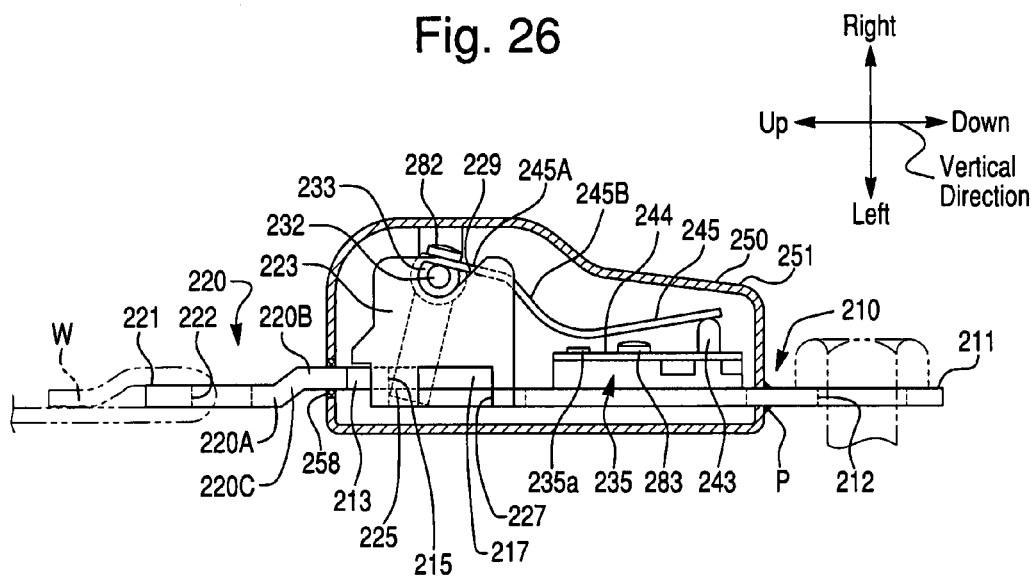

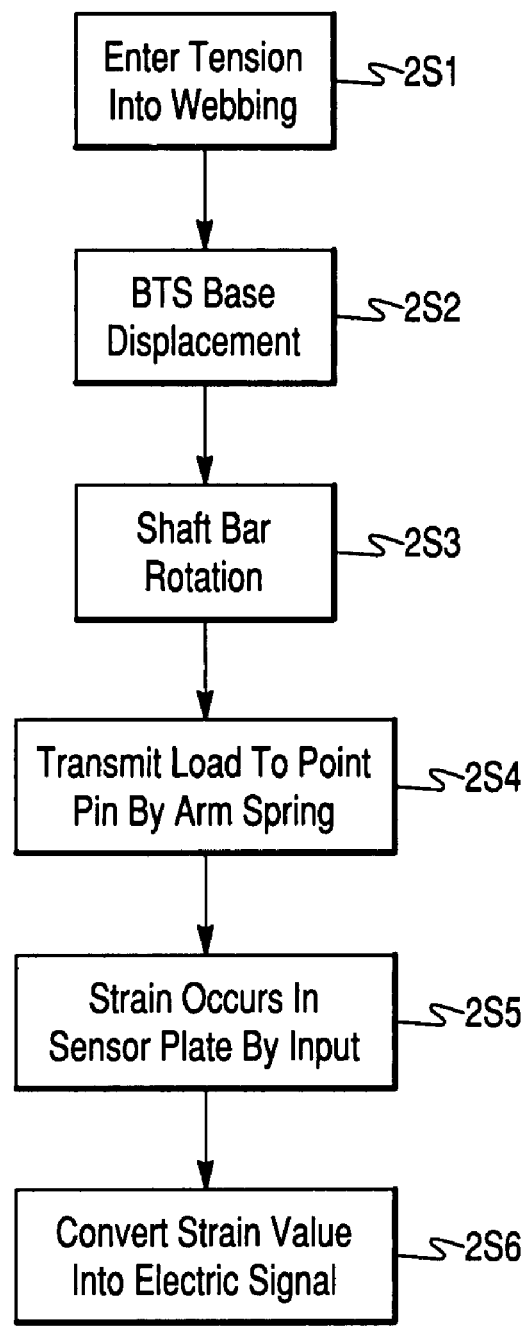

SEAT BELT DEVICE

CROSS-REFERENCE TO RELATED PATENT APPLICATIONS

The instant application is a continuation-in-part of U.S. patent application Ser. No. 10/604,319 filed on Jul. 10, 2003, now U.S. Pat. No. 7,100,944 which claims the benefit of U.S. Provisional Application Ser. No. 60/394,815 filed on Jul. 10, 2002. Both of the foregoing patent applications are incorporated herein by reference.

BACKGROUND

The present application relates to a seat belt tension sensor which is installed on an anchor section fixing a seat belt to a vehicle body and measures the tension applied to the belt. The application also relates to a seat belt tension sensor which permits easy manufacture, downsizing and accurate detection of a tension. An automobile has an air bag in many cases for ensuring safety for the driver and passengers. An ordinary air bag is designed to have a spread gas pressure sufficient to restrain an adult upon collision at a high speed. When a passenger is a child sitting in a child seat, however, it is not necessary that the air bag inflates in the same manner as to an adult. Recently, therefore, for the purpose of ensuring more appropriate operation of the air bag, there is a tendency toward detecting the condition of the passenger by measuring the seat belt tension and controlling the air bag operation in response thereto.

As an apparatus for detecting the seat belt tension, there is developed an apparatus for calculating the seat belt tension by a microprocessor on the basis of a voltage signal detected by a Hall effect sensor. When this apparatus detects a high belt tension (a belt tension so high as offensive to an ordinary passenger), the air bag control system determines that the child seat is secured by the seat belt, and inhibits the air bag from inflating.

Such a seat belt tension sensor is installed in many cases in an anchor section which fixes an end of the seat belt to the vehicle. Since the anchor section is provided on the seat side of the vehicle body, it is highly probable that moisture or much splashes on the seat belt tension sensor. The seat belt meter of this kind should therefore have sufficient waterproofing property and dusttightness.

BRIEF DESCRIPTION OF THE DRAWINGS

Features, aspects and advantages of the present invention will become apparent from the following description, appended claims, and the accompanying exemplary embodiments shown in the drawings, which are briefly described below and which constitute part of this specification.

FIG. 5 illustrates a prior art method of attaching a seat belt to a seat belt tension sensor;

FIG. 6 illustrates an embodiment of an improved method of attaching a seat belt to a seat belt tension sensor;

FIG. 7 illustrates a plot of seat belt tension sensor output as a function of seat belt tension comparing the prior art and improved attachments of a webbing of a seat belt to a seat belt tension sensor;

FIGS. 16a and 16b illustrate yet another method of attaching a seat belt to the seat belt tension sensor, wherein the opening of the housing and anchor plate are adapted to reduce or prevent friction from the loop of webbing therewith.

FIG. 19 is an exploded perspective view of a conventional seat belt tension meter.

FIG. 25 is a side sectional view illustrating a state in which the belt tension does not act on the seat belt tension meter shown in FIG. 23.

FIG. 26 is a side sectional view illustrating a state in which the belt tension acts on the seat belt tension meter shown in FIG. 23.

FIG. 31 is an operating flowchart of the seat belt tension meter of the prior device.

DESCRIPTION

There is a need to measure a tensile load in a seat belt used in vehicular safety restraint system, wherein the seat belt load measurement can be used to distinguish a type of object secured by the seat belt, or can be used to compensate for the affect of seat belt loads upon a measurement of seat weight from a seat weight sensor in the seat base.

Figure 1:
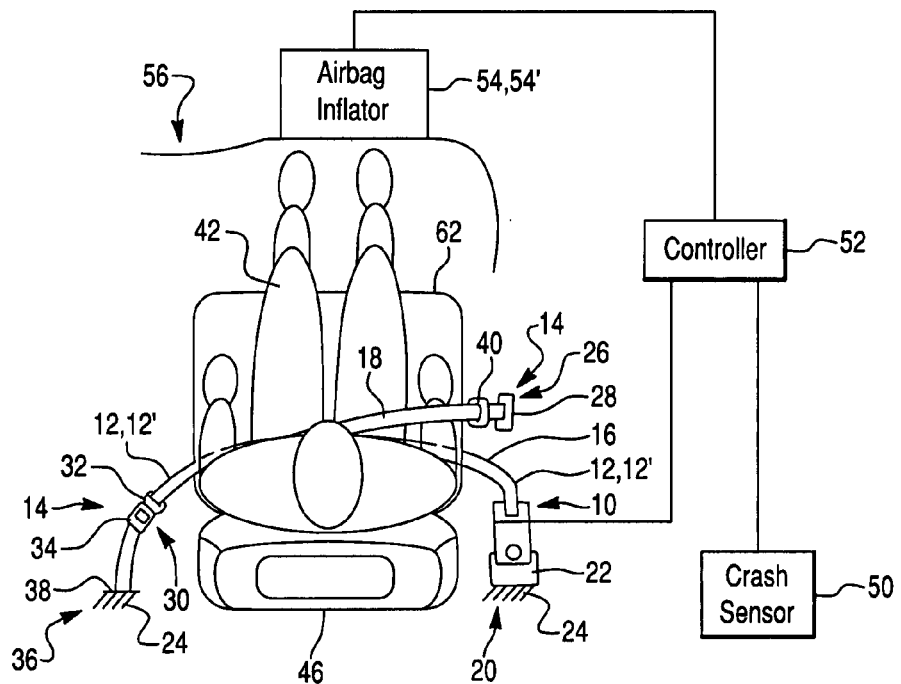
FIG. 1 illustrates a top-view of an occupant wearing a seat belt in a vehicle seat, wherein the seat belt incorporates a seat belt tension sensor.

Referring to FIG. 1, a seat belt tension sensor 10 is operatively coupled to a webbing 12 of a seat belt 14, for measuring a tensile load therein.

The seat belt 14 illustrated in FIG. 1—generally known as a "three-point" seat belt with a continuous loop lap/shoulder belt—comprises a lap belt portion 16 and a shoulder belt portion 18, wherein one end of the lap belt portion 16 the seat belt 14 is attached at a "first point" 20 to a first anchor 22 secured to the vehicle frame 24, one end of the shoulder belt portion 18 is attached at a "second point" 26 to a seat belt retractor 28 secured to the vehicle frame 24, and the other ends of the lap belt portion 16 the shoulder belt portion 18 are located where the seat belt 14 passes through a loop 30 in a latch plate 32 that engages with a buckle 34 that is attached at a "third point" 36 to a second anchor 38 secured to the vehicle frame 24. The shoulder belt portion 18 passes through a "D-ring" 40 operatively connected to the vehicle frame 24 that guides the shoulder belt portion 18 over a shoulder of the occupant 42.

The seat belt retractor 28 has a spool that either provides or retracts webbing 12 as necessary to enable the seat belt 14 to placed around the occupant 42 sufficient to engage the latch plate 32 with the buckle 34, and to remove excess slack from the webbing 12. The seat belt retractor 28 provides a nominal tension in the seat belt 14 so that, responsive to a crash that causes the seat belt retractor 28 to lock the webbing 12 thereby preventing further withdrawal, the occupant 42 is restrained by the seat belt 14 relatively earlier in the crash event than would occur had there been slack in the seat belt 14. During the crash event, when restraining the occupant 42, the webbing 12 of the seat belt 14 can be exposed to a relatively high tensile load, the magnitude of which depends upon the severity of the crash and the mass of the occupant 42.

Figure 2:
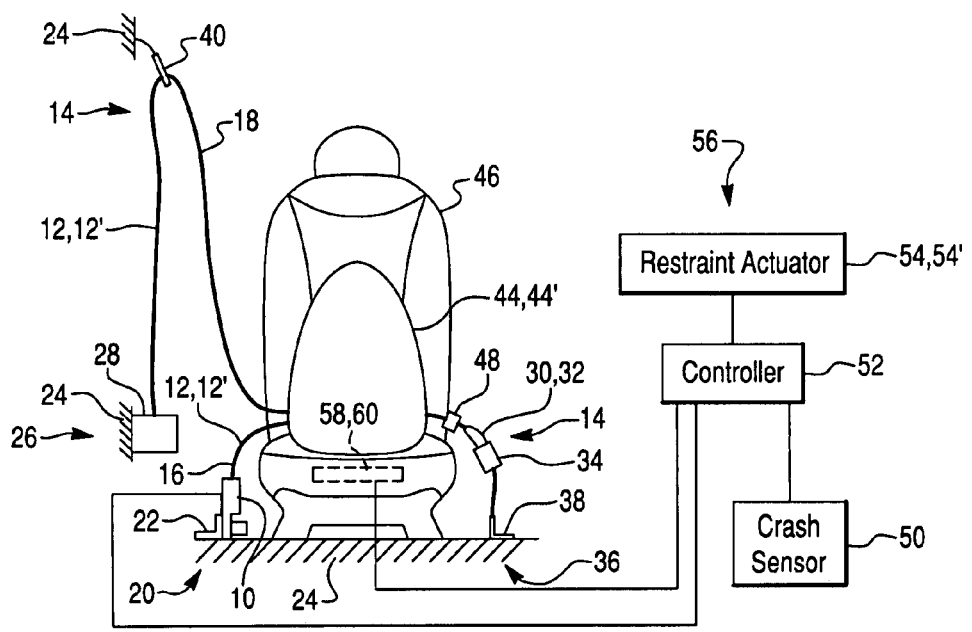
FIG. 2 illustrates a front-view of a vehicle seat upon which a child seat is secured by a seat belt, wherein the seat belt incorporates a seat belt tension sensor and the vehicle seat incorporates a seat weight sensor.

Referring to FIG. 2, the lap belt portion 16 of a seat belt 14 may also be used to secure a child seat 44, such as a rear facing infant seat 44', to the vehicle seat 46, wherein a locking clip 48 may be used to prevent the shoulder belt portion 18 from sliding relative to the lap belt portion 16 proximate to the latch plate 32. In this case, the lap belt portion 16 is typically secured relatively tight—with an associated tensile load greater than the associated comfort limit for an adult—so as to hold the child seat 44 firmly in the vehicle seat 46 by compressing the seat cushion thereof, and the shoulder belt portion 18 is not otherwise relied upon for restraint.

Accordingly, the tensile load in the webbing 12 of the seat belt 14 can be used to discriminate an object on the vehicle seat 46, wherein a tensile load greater than a threshold would be indicative of a child seat 44. Referring to FIGS. 1 and 2, a seat belt tension sensor 10 is operatively coupled to a lap belt portion 16 of a webbing 12 of a seat belt 14 at a particular seating location. The seat belt tension sensor 10 and a crash sensor 50 are operatively coupled to a controller 52 that is adapted to control the actuation of a restraint actuator 54—e.g., an air bag inflator 54'—of a safety restraint system 56 located so as to protect an occupant at the particular seating location. If the tensile load sensed by the seat belt tension sensor 10 is greater than a threshold, then the restraint actuator 54 is disabled by the controller 52 regardless of whether or not a crash is detected by the crash sensor 50. If the tensile load sensed by the seat belt tension sensor 10 is less than a threshold, then the restraint actuator 54 is enabled by the controller 52 so that the restraint actuator 54 can be actuated responsive to a crash detected by the crash sensor 50. Alternately, for a controllable restraint actuator 54, e.g. a multi-stage air bag inflator 54', the timing and number of inflator stages inflated can be controlled to effect a reduced inflation rate rather than disabling the air bag inflator 54' responsive to the seat belt tension sensor 10 sensing a tensile load greater than a threshold.

Referring to FIG. 2, a seat belt tension sensor 10 may be used in conjunction with at least one other occupant sensor 58, e.g. a seat weight sensor 60, to control the actuation of a safety restraint system 56. The seat weight sensor 60 may operate in accordance with any of a variety of known technologies or embodiments, e.g. incorporating a hydrostatic load sensor, a force sensitive resistor, a magnetostrictive sensing elements, or a strain gage load sensor, which, for example, either measure at least a portion of the load within the seat cushion 62, or measure the total weight of the seat. In either case, a tensile load in the seat belt 14 that is reacted by the vehicle frame 24 acts to increase the load upon the seat cushion 62, thereby increasing the apparent load sensed by the seat weight sensor 60. The apparent load is increased by each reaction force, so that a given tensile load in the seat belt 14 could increase the apparent load sensed by the seat weight sensor 60 by as much as twice the magnitude of the tensile load. Accordingly, in a system with both a seat belt tension sensor 10 and a seat weight sensor 60, the seat weight measurement from the seat weight sensor 60 can be compensated for the effect of tensile load in the seat belt 14 so as to provide a more accurate measure of occupant weight, by subtracting, from the seat weight measurement, a component of seat weight caused by, or estimated to have been caused by, the tensile load measured by the seat belt tension sensor 10. If the seat weight measurement from the seat weight sensor 60 is not compensated for the effect of the tensile load in the seat belt 14, a child seat 44 secured to a vehicle seat 46 with a seat belt 14 could cause a load on the seat weight sensor 60 that is sufficiently high to approximate that of a small adult, so that an uncompensated seat weight measurement might cause the associated restraint actuator 54 to be erroneously enabled in a system for which the restraint actuator 54 should be disabled when a child seat 44 is on the vehicle seat 46.

In a system that compensates for the affect of seat belt tension on an occupant sensor 58, the seat belt tension sensor 10, the occupant sensor 58,—e.g. a seat weight sensor 60,—arid a crash sensor 50 are operatively coupled to a controller 52 that is adapted to control the actuation of a restraint actuator 54—e.g., an air bag inflator 54'—of a safety restraint system 56 located so as to protect an occupant at the particular seating location. If the tensile load sensed by the seat belt tension sensor 10 is greater than a threshold, then the restraint actuator 54 is disabled by the controller 52 regardless of whether or not a crash is detected by the crash sensor 50 or regardless of the measurement from the occupant sensor 58. If the tensile load sensed by the seat belt tension sensor 10 is less than a threshold, then the restraint actuator 54 is enabled or disabled by the controller 52 responsive to a measurement from the occupant sensor 58, which may be compensated responsive to the tensile load sensed by the seat belt tension sensor 10. If the restraint actuator 54 is enabled, then the restraint actuator 54 can be actuated responsive to a crash detected by the crash sensor 50. Alternately, for a controllable restraint actuator 54, e.g. a multi-stage air bag inflator 54', the timing and number of inflator stages inflated can be controlled to effect a reduced inflation rate rather than disabling the air bag inflator 54' responsive to measurements from the occupant sensor 58 and the seat belt tension sensor 10.

Figure 3:
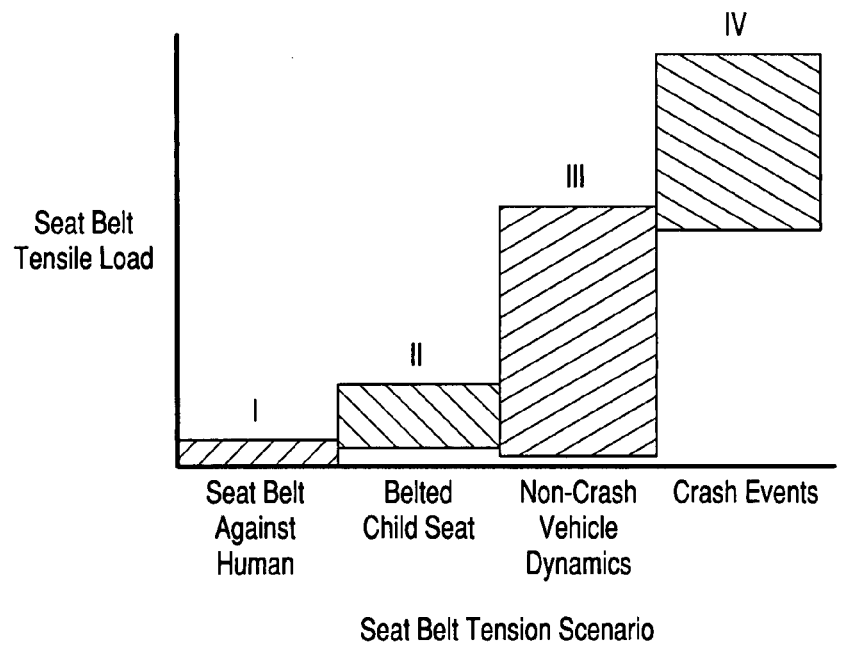
FIG. 3 illustrates scenarios associated with various seat belt tensile load ranges.

Referring to FIG. 3, the loads to which a seat belt 14 is normally exposed can be classified into four ranges as follows: 1) a low range (I) comprising tensile loads associated with the seat belt 14 being placed directly around a human, 2) a low-intermediate range (II) comprising tensile loads associated with the restraint a child seat 44, 3) a high-intermediate range (III) comprising loads associated with non-crash vehicle dynamics, e.g. braking or rough roads, and 4) a high range (IV) comprising tensile loads associated with restraint forces of a crash event. The low range (I), for example, would normally be limited by the maximum tensile load that an occupant 42 could comfortably withstand. The low-intermediate range (II), for example would normally be limited by the maximum tensile load that a person could apply to the seat belt 14 while securing a child seat 44 to the vehicle seat 46. Notwithstanding that the seat belt 14 and associated load bearing components can be subject to the high range (IV) tensile loads, a seat belt tension sensor 10 would be useful for controlling a safety restraint system 56 if it were capable of measuring low-intermediate range (II) tensile loads associated with securing a child seat 44 to a vehicle seat 46.

Figure 4:
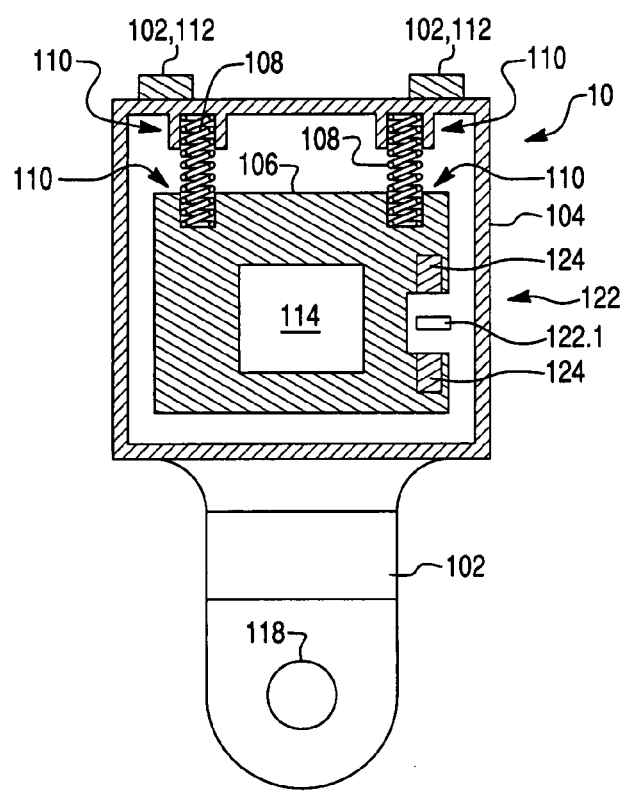
FIG. 4 illustrates a cross-sectional view of seat belt tension sensor.

Referring to FIGS. 4-6, an exemplary seat belt tension sensor 10 comprises an assembly of an anchor plate 102, a housing 104, a carriage 106 moveable within the housing 104, and a pair of helical compression springs 108 disposed between the carriage 106 and the housing 104 within associated spring guide cavities 110. The housing 104 engages and is restrained by a pair of fingers 112 extending from the anchor plate 102, and is also attached to the anchor plate 102 with a screw. Openings 114 in the carriage 106, housing 104 and anchor plate 102 are aligned so as form an opening 114 in the assembly to which is attached a loop 116 of webbing 12 of a seat belt 14. The anchor plate 102 further comprises a mounting hole 118 by which the seat belt tension sensor 10 is attached with an anchor bolt 120 to a vehicle frame 24. A proximity or displacement sensor 122 measures the position of the carriage 106 relative to the anchor plate 102. For example, a Hall-effect sensor 122.1 or the like, operatively coupled to the housing 104, cooperates with a pair of magnets 124 that are mounted in the carriage 106 so as to provide an output signal that is responsive to the position of the carriage 106 with respect to the anchor plate 102.

In operation, a tension in the webbing 12 of the seat belt 14 is applied to the carriage 106 and is reacted by the carriage 106 through the helical compression springs 108, the housing 104, the anchor plate 102 and the anchor bolt 120. The displacement of the carriage 106 is responsive to the tension, and is sensed by the Hall-effect sensor 122.1, the output of which is responsive to the strength of the magnetic field thereat—generated by the magnets 124 that move with the carriage 106—which provides a measure of displacement of the carriage 106 relative to the housing 104 and anchor plate 102, which in turn provides a measure of seat belt tension based upon the effective compliance of the helical compression springs 108. Accordingly, a tension in the seat belt 14 causes a motion of the carriage 106, and this motion is calibrated by the effective force-displacement characteristic of the helical compression springs 108, which provides for generating a measure of seat belt tension from a measure of displacement of the carriage 106 relative to the housing 104 and anchor plate 102. The webbing 12 of a seat belt 14 moves with the carriage 106 relative to the housing 104 responsive to a tension in the seat belt 14. More particularly, the webbing 12 slides over the surface of the seat belt tension sensor 10 (e.g. housing 104 and anchor plate 102) responsive to this motion, thereby generating associated frictional forces in a direction that is opposite to the direction of motion. These frictional forces cause an associated hysteresis in the output signal from the Hall-effect sensor 122.1, i.e. a dependence of the output upon whether the seat belt tension is increasing or decreasing, as illustrated in FIG. 7.

Stated in another way, the seat belt tension sensor 10 comprises an assembly of a first portion of the seat belt tension sensor 10, and a carriage 106 moveable relative thereto, wherein openings 114 in the first portion—i.e. openings 114 in the anchor plate 102 and housing 104—cooperate with the opening 114 in the carriage 106. A seat belt 14 looped through the opening 114 in the first portion of the seat belt tension sensor 10, if not otherwise constrained, is susceptible of generating non-negligible frictional forces and associated hysteresis as a result of rubbing against either a side or an outer surface of the opening 114 in the first portion of the seat belt tension sensor 10, responsive to a tension load applied to the seat belt 14.

Referring to FIG. 5, in accordance with a prior art method of attaching a seat belt 14 to a seat belt tension sensor 10, the webbing 12 is looped through the opening 114 in the carriage 106, housing 104 and anchor plate 102 of the seat belt tension sensor 10, and the two resulting portions of the webbing 12 (on either side of the opening 114) are laid against one another and sewn together at a first set of stitches 126 across the width of the webbing 12, so as to form a closed loop 116 of webbing 12 through the opening 114 and around the seat belt tension sensor 10. The first set of stitches 126 are adapted to be sufficiently strong to safely withstand the full range of tension loads to which the webbing 12 is exposed during the operation of the seat belt 14. For the width of the opening 114 substantially narrower than the nominal width of the webbing 12, the webbing 12 of the loop 116 is bunched or folded together within the opening 114 and fans out 128 from the opening 114 to the first set of stitches 126, on both sides of the seat belt tension sensor 10. For example, the width of the opening 114 may be about half the nominal width of the webbing 12, or less. The bunching of the webbing 12 within the opening 114 generates lateral forces against the sides of the opening 114 in the housing 104 and/or anchor plate 102 when a tension is applied to the webbing 12, which cause associated frictional forces that oppose motion of the webbing 12 relative to the housing 104, which reduce the apparent tension sensed by the seat belt tension sensor 10 as the tension is in the webbing 12 is increased, and which increase the apparent tension sensed by the seat belt tension sensor 10 as the tension is in the webbing 12 is decreased, thereby causing substantial measurement hysteresis as is illustrated in FIG. 7 in the plot of the output of the Hall-effect sensor 122.1 of the seat belt tension sensor 10 as a function of the associated seat belt tension for the seat belt attachment illustrated in FIG. 5.

Referring to FIG. 6, illustrating an improved method of attaching a seat belt 14 to the seat belt tension sensor 10, the webbing 12 of the loop 116 is bunched or folded together within the opening 114, and is further bunched or folded above the opening 114, e.g. where the webbing 12 follows the outside surfaces of the seat belt tension sensor 10, so as to prevent the webbing 12 from rubbing against the sides of the housing 104 and/or anchor plate 102. For example, in the embodiment illustrated in FIG. 6 a second set of stitches 130 are provided in the loop 116, between the first set of stitches 126 and the restraining end 132 of the housing 104 within the loop 116, so as to prevent the bunched or folded webbing 12 from fanning out from the opening 114. Instead, the second set of stitches 130 substantially prevent the width of the bunched or folded webbing 12 within the opening 114 from expanding with increasing seat belt tension, thereby reducing associated frictional forces against the sides of the opening 114 in the anchor plate 102 or housing 104 that cause associated measurement hysteresis. Referring to FIG. 7, the measurement hysteresis for the embodiment of FIG. 6 is substantially less than that for the embodiment of FIG. 5.

There are various means that may be used to constrain the width of the webbing 12 along the seat belt tension sensor 10. In the embodiment of FIG. 6, both portions 134, 136 of the webbing 12 of the loop 116 are folded and stitched together with a second set of stitches 130, as further illustrated in FIG. 8.

Figure 9:
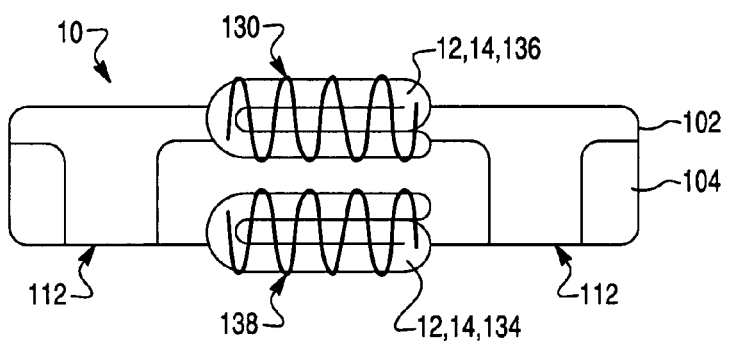
FIG. 9 illustrates another method of attaching a seat belt to the seat belt tension sensor, wherein portions of a loop of webbing are folded and stitched separately.
Figure 10:
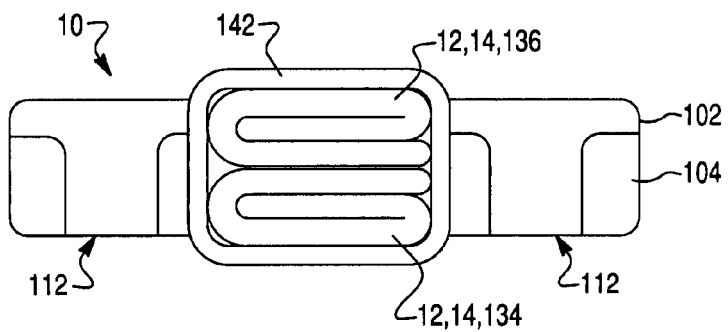
FIG. 10 illustrates yet another method of attaching a seat belt to the seat belt tension sensor, wherein a loop of webbing is bunched or folded within a ring.

Referring to FIG. 9, in another embodiment of an improved method of attaching a seat belt 14 to the seat belt tension sensor 10, the individual portions 134, 136 of the webbing 12 of the loop i 16 is separately folded and sewn with respective third 138 and fourth 140 sets of stitches Referring to FIG. 10, in yet another embodiment of an improved method of attaching a seat belt 14 to the seat belt tension sensor 10, both portions 134, 136 of the webbing 12 of the loop 116 are bunched or folded within a ring 142, e g a metal ring, located between the seat belt tension sensor 10 and the first set of stitches 126, wherein the ring 142 may be either closed as illustrated in FIG. 10, or open—e.g. along a portion of one side thereof—but with sufficient rigidity and shaped so as to maintain the bunched or folded condition of the webbing 12 within the ring 142.

Figure 11:
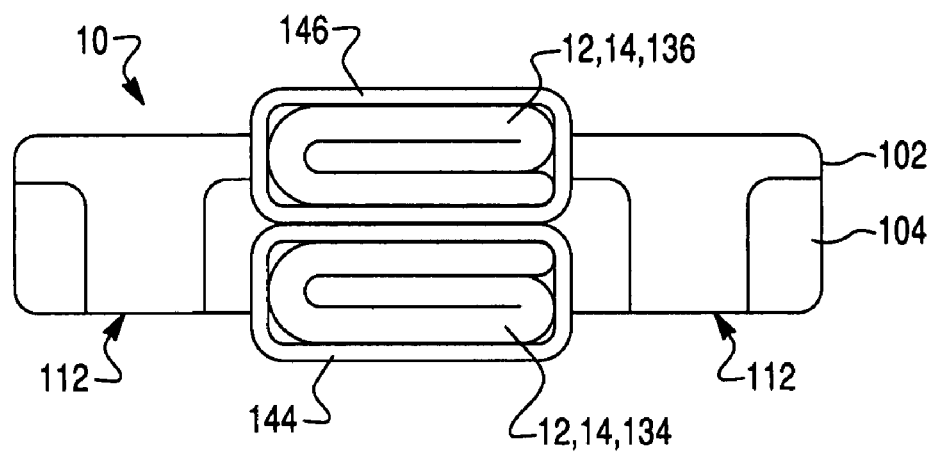
FIG. 11 illustrates yet another method of attaching a seat belt to the seat belt tension sensor, wherein portions of a loop of webbing are bunched or folded within separate rings.

Referring to FIG. 11, in yet another embodiment of an improved method of attaching a seat belt 14 to the seat belt tension sensor 10, each portion 134, 136 of the webbing 12 of the loop 116 is bunched or folded within a respective ring 144, 146, e g respective metal rings, located between the seat belt tension sensor 10 and the first set of stitches 126, wherein one or both rings 144, 146 may be either closed as illustrated in FIG. 11, or open—e.g. along a portion of one side thereof—but with sufficient rigidity and shaped so as to maintain the bunched or folded condition of the webbing 12 within the respective rings 144, 146.

Figure 12:
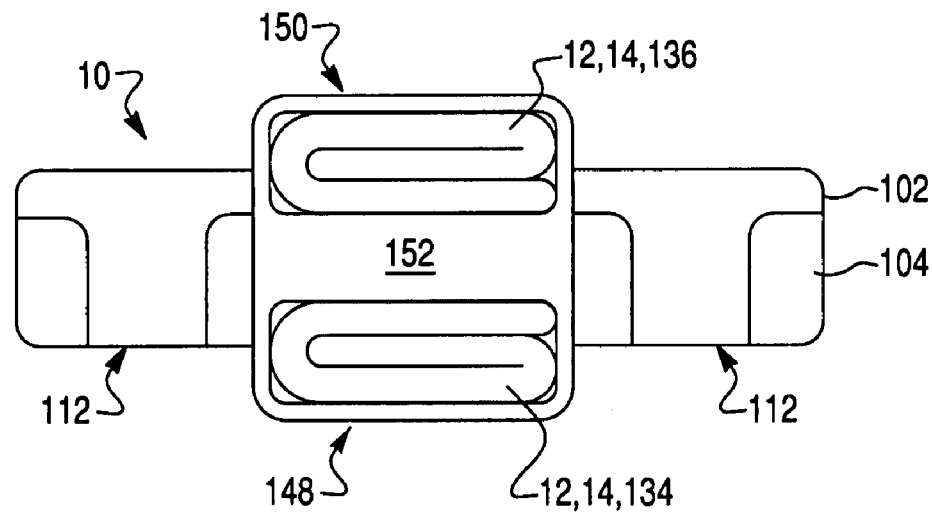
FIG. 12 illustrates yet another method of attaching a seat belt to the seat belt tension sensor, wherein portions of a loop of webbing are bunched or folded within separate ring portions that are separated from one another.

Referring to FIG. 12, in yet another embodiment of an improved method of attaching a seat belt 14 to the seat belt tension sensor 10, each portion 134, 136 of the webbing 12 of the loop 116 is bunched or folded within a respective ring portion 148, 150, located between the seat belt tension sensor 10 and the first set of stitches 126, wherein the ring portions 148, 150 are separated by a spacer 152 that keeps the loop 116 sufficiently open so as to reduce rubbing and associated frictional forces between the loop 116 and the surfaces of the housing 104 and/or anchor plate 102, wherein one or both ring portions 148, 150 may be either closed as illustrated in FIG. 12, or open—e.g. along a portion of one side thereof—but with sufficient rigidity and shaped so as to maintain the bunched or folded condition of the webbing 12 within the respective ring portions 148, 150.

Figure 13A:
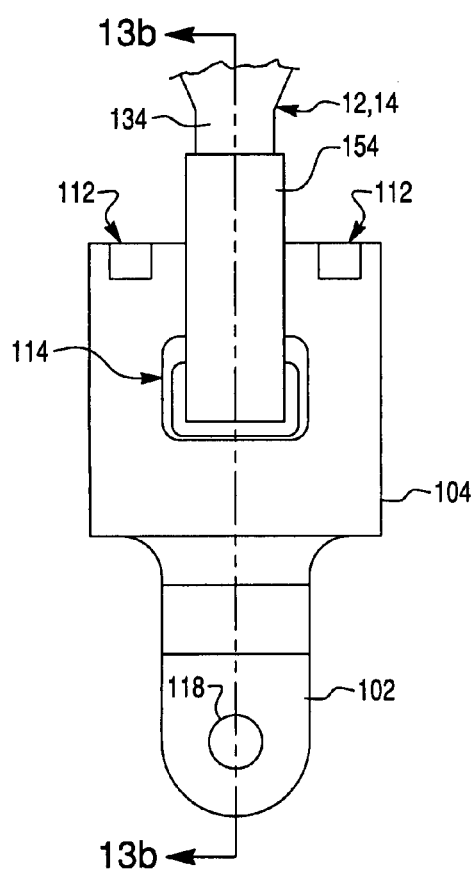
FIGS. 13a and 13b illustrate yet another method of attaching a seat belt to the seat belt tension sensor, wherein a loop of webbing is bunched or folded within a sleeve that engages a carriage of the seat belt tension sensor.
Figure 13B:
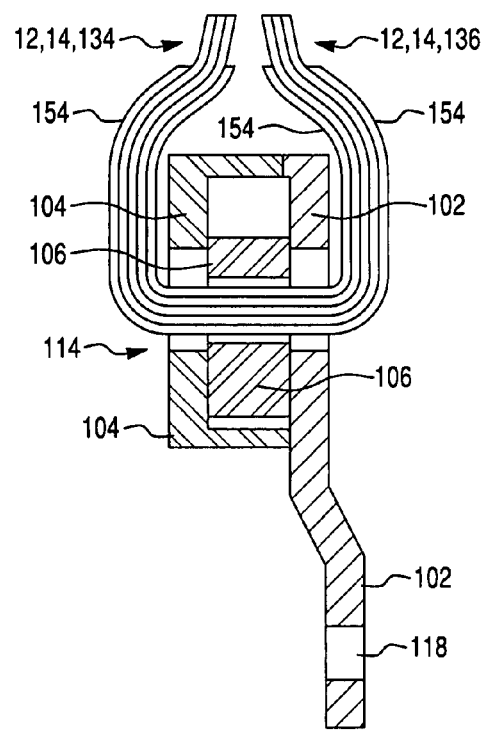
Figure 14A:
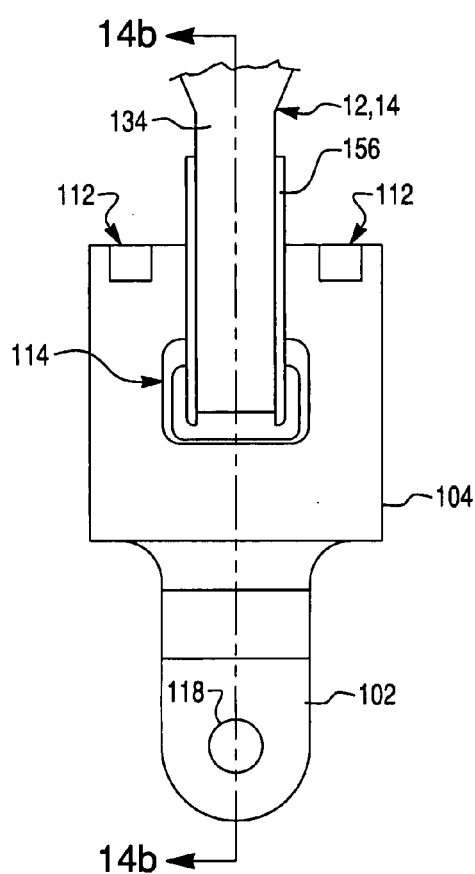
FIGS. 14a and 14b illustrate yet another method of attaching a seat belt to the seat belt tension sensor, wherein a loop of webbing is bunched or folded around a thimble that engages a carriage of the seat belt tension sensor.
Figure 14B:
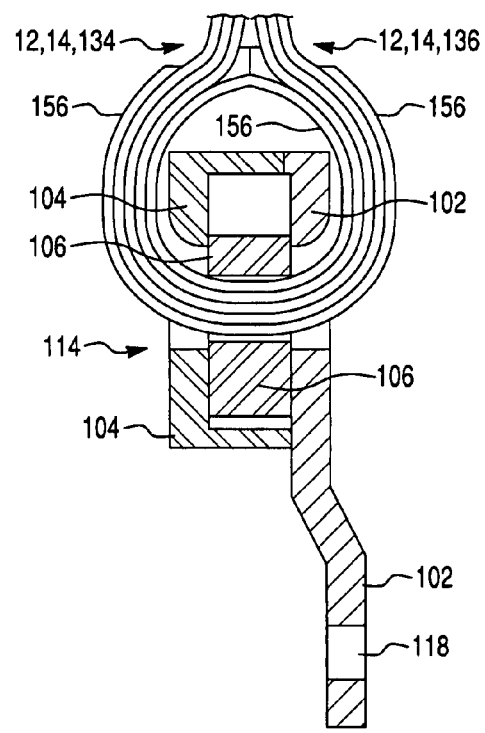
Figure 15A:
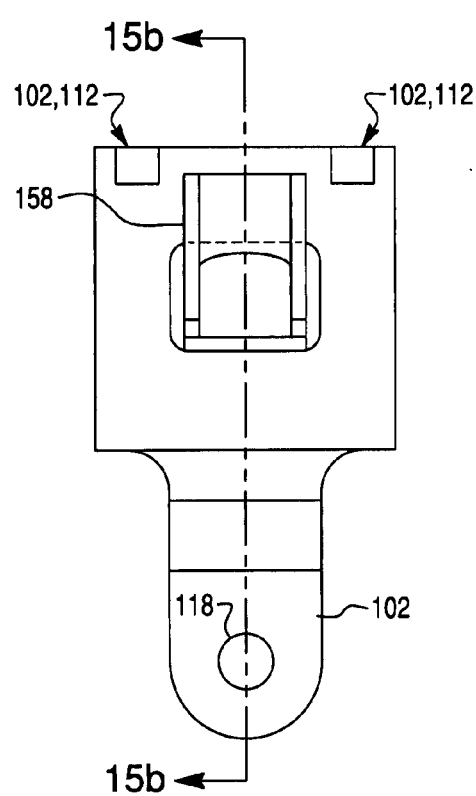
FIGS. 15a and 15b illustrate yet another method of attaching a seat belt to the seat belt tension sensor, wherein a loop of webbing is bunched or folded around a thimble portion of a carriage of the seat belt tension sensor.
Figure 15B:
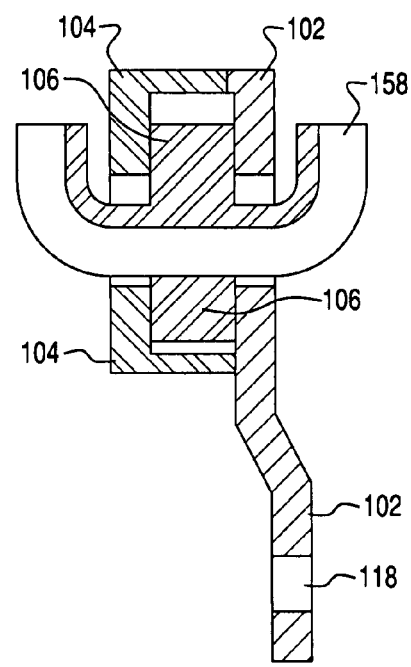

Referring to FIGS. 13a and 13b, in yet another embodiment of an improved method of attaching a seat belt 14 to the seat belt tension sensor 10, the loop 116 of webbing 12 is fed through a sleeve 154, e g of plastic, that engages the carnage 106 of the seat belt tension sensor 10 and keeps the webbing 12 bunched or folded therein so as to prevent the loop 116 from rubbing against the sides of the opening(s) 114 in the housing 104 and/or anchor plate 102. An at least semi-rigid sleeve 154 could be shaped so as to keep the loop 116 open, so as to reduce or prevent friction caused by the loop 116 rubbing against the face(s) of the housing 104 and/or anchor plate 102 Referring to FIGS. 14a and 14b alternately a thimble 156 could be used instead of a sleeve 154 Referring to FIGS. 15a and 15b, alternately a thimble portion 158 could be incorporated in the carriage 106 to engage a bunched or folded webbing 12 of the loop 116 and to thereby reduce or prevent friction caused by the loop 116 rubbing against the face(s) of the housing 104 and/or anchor plate 102.

Referring to FIGS. 16a and 16b, in yet another embodiment of an improved method of attaching a seat belt 14 to the seat belt tension sensor 10, the openings 114 in the housing 104 and anchor plate 102 are adapted to be sufficiently wider than that of the opening 114 in the carriage 106 so as to keep the bunched or folded webbing 12 of the loop 116 within the opening 114 of the carriage 106 from rubbing against the sides of the openings 114 in the housing 104 and anchor plate 102 when the seat belt 14 is tensioned. This may be combined with either a flange 160—or as illustrated in FIG. 15, a thimble portion 158—on the carnage 106 so as to reduce or prevent friction caused by the loop 116 rubbing against the face(s) of the housing 104 and/or anchor plate 102.

According to another embodiment of the invention a seat belt tension sensor is provided. The sensor is installed in an anchor portion where an end of a seat belt is fixed to the vehicle body, having an anchor connecting member connected to the vehicle body, a webbing connecting member connected to the seat belt, and a sensor mechanism which detects a force acting between these embers; wherein the sensor mechanism has a shaft bar rotating by relative displacement of the members generated by a force applied between the members; the shaft bar has an arm spring rotating therewith; the arm spring applies, together with rotation of the shaft bar, a pressing force to a sensor plate having a strain gage attached thereto, while deforming; the shaft bar is formed by die casting; a hole is formed in a portion not forming the joint of a divided mold; and the arm spring is secured to the shaft bar by screwing a tapping screw in the hole.

According to this embodiment, holes of the arm spring may be provided for fixing the arm spring with tapping screws are formed in a portion not serving as the joint between the divided mold halves. It is therefore possible to form these holes by die casting. The hole forming step by machining conventionally required can therefore be omitted.

According to another second embodiment, the arm spring may be divided into a fixed portion fixed to the shaft bar and a free end portion other than the fixed portion; the free end portion is flat; and the fixed portion is folded from the free end portion, and fixed to the shaft bar.

In this embodiment, the free end is formed into a flat surface. It is not therefore necessary to conduct bending fabrication of the arm spring. Smooth transmission of force to the sensor plate can prevent hysteresis from occurring.

According to another embodiment, the shaft bar comprises a substantially square-shaped member; and the arm spring extends from one side to the other side of the shaft bar along the inner side of the square-shaped portion of the shaft bar, is folded there, and the fixed portion is fixed to a side of the square-shaped portion of the shaft bar.

In this embodiment, the free end portion of the arm spring is provided along the inner side of the square shape of the shaft bar. The height of the arm spring position can accordingly be reduced, thereby permitting reduction of the height of the sensor plate position. The thickness of the sensor base can accordingly be reduced, thereby permitting achievement of a lighter weight and a lower cost. Since the portion fixing the arm spring is on the side opposite to the extending direction of the free end of the arm spring, it is easier to carry out fixing operation using tapping screws.

In general, the word "folding" refers to the shape of the belt as it is attached to the belt tension sensor and does not mean folding at the time of attachment in an actual manufacturing process.

Figure 20:
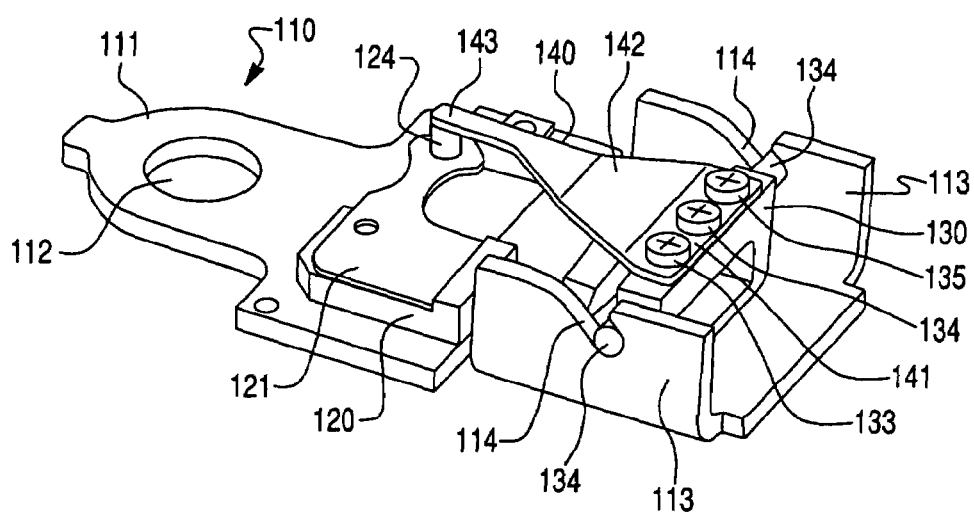
FIG. 20 is an assembly perspective view of the seat belt tension meter shown in FIG. 19.

As shown in FIGS. 19 and 20, a seat belt tension meter roughly comprises a base plate 110, a sensor mechanism section having a sensor base 120, a sensor plate 121, a shaft bar 130 and an arm spring 140, and a cover 150.

The base plate 10 is a portion (anchor connecting member) to be fixed to the vehicle body, comprising, for example, a flat steel sheet (SPFH). A connecting section 111 is formed at the leading end of the base plate 110, and a hole 112 is provided at the center thereof. An anchor bolt (not shown) for securing the connecting section 111 to the structure of the vehicle body is inserted into this hole 112. The outer peripheral edge of the connecting section 111 is formed into a semicircular shape. A rising main sill 113 is formed on the both sides in the width direction of the other end of the base plate 110. A substantially semicircular engagement notch 114 is formed on the upper edge of each of the main sills 113. A hole 115 is pierced in the middle between the two main sills 113. An intermediate portion 116 for attaching the sensor mechanism and the cover 150 is provided and screw holes 110a to 110e are pierced in the middle between the portions where the connecting section 111 and the both main sills 113 are formed.

The sensor base 120 is made of an aluminum die-cast alloy into substantially a square-shaped member. The sensor plate 121 is attached to this sensor base 120. A screw 122 is inserted into a hole 120a thereof, and a screw 123, into a hole 120b thereof, and are secured to screw holes 110a and 110b of the base plate 110, respectively. The screw 123 is inserted also into a hole 121a of the sensor plate 121, and as a result, secures the sensor plate 121 comprising a stainless steel sheet or the like to the sensor base 120.

Four strain gages are affixed to the sensor plate 21, and an ASIC (Application Specific Integrated Circuit) for converting a detection value into an electric signal is attached thereto. A point pin 124 is attached to a hole 121b of the sensor plate 121.

The shaft bar 130 forms a part of the sensor mechanism, and constitutes a webbing connecting member which is connected to the webbing. This is, for example, substantially square-shaped member made of a zinc die-cast alloy, comprising an upper member 131, a side member 132, and a lower member 133 integrally formed. In addition, a cylindrical rotary shaft member 134 is formed integrally on the both sides of the upper member 131. Through holes 130a, 130b and 130c are pierced on the upper surface of the upper member 131. Tapping screws 135, 136 and 137 inserted into holes 140a, 140b and 140c of the arm spring 140 are screwed into these holes 130a to 130c, and as a result, the arm spring 140 is secured to the shaft bar 130.

The arm spring 140 is a spring plate comprising a stainless steel sheet or the like, and has a fixing section 141, and an extending section 142 extending diagonally downward from this fixing section 141. The leading end of the extending section 142 forms a contact section 143. The fixing section 41 is secured to the shaft bar 130 as described above. The contact section 143 is arranged so as to be in contact with the leading end of the point pin 124 of the sensor plate 121.

Screws 151, 152 and 53 are inserted into holes 150a, 150b and 150c formed in a cover 150 and then screwed into the screw holes 110c, 110d and 110e of the base plate 110, and as a result, the cover 150 is secured to the base plate 110.

In the state of assembly shown in FIG. 20, the rotary shaft member 134 of the shaft bar 130 is fitted into the engagement notches 114 formed in the both main sills of the base plate 110, and is rotatably supported. The lower member 133 of the shaft bar 130 is fitted into the hole 115 of the base plate 110, and can rotate within the range of the hole 115. A webbing is wound on the lower member 133 of the shaft bar 130, and connected thereto.

In FIG. 20, when tension is applied to the webbing, the base plate 110 is fixed to the vehicle body. The shaft bar 130 therefore rotates anticlockwise in FIG. 20 around the rotary shaft member 134 fitted into the engagement notches 114 formed in the both main sills 113 of the base plate 110. As a result, the arm spring 140 deforms, and the contact section 143 thereof presses the point pin 124 of the sensor plate 121. This pressing force causes deformation of the sensor plate 121, and an output corresponding to the tension is produced from the strain gage attached thereto. By measuring this output, therefore, it is possible to measure the seat belt tension.

However, the above-mentioned seat belt tension meter had the following problems. For the necessity to attach to the vehicle body, such a seat belt tension meter must be downsized as far as possible. However, a problem lies in that, since the arm spring 140 is screw-fixed above the shaft bar 130, the thickness is increased by that of the arm spring 140 and the tapping screws 135, 136 and 137.

When casting the shaft bar 130, the mold is divided into two in a direction toward a smaller thickness. Therefore, the upper surface shown in FIG. 19, i.e., the portion having the holes 130a to 130c formed therein serves as the joint surface of the two mold halves, and holes cannot be formed by die casting in this portion. As a result, the holes 130a to 130c must be formed by machining after die casting, leading to a problem of increased number of steps.

In addition, the free end of the arm spring which is a curved surface requires bending fabrication and transmission of force to the sensor plate is not stabilized, thus causing a problem of occurrence of hysteresis.

Figure 17:
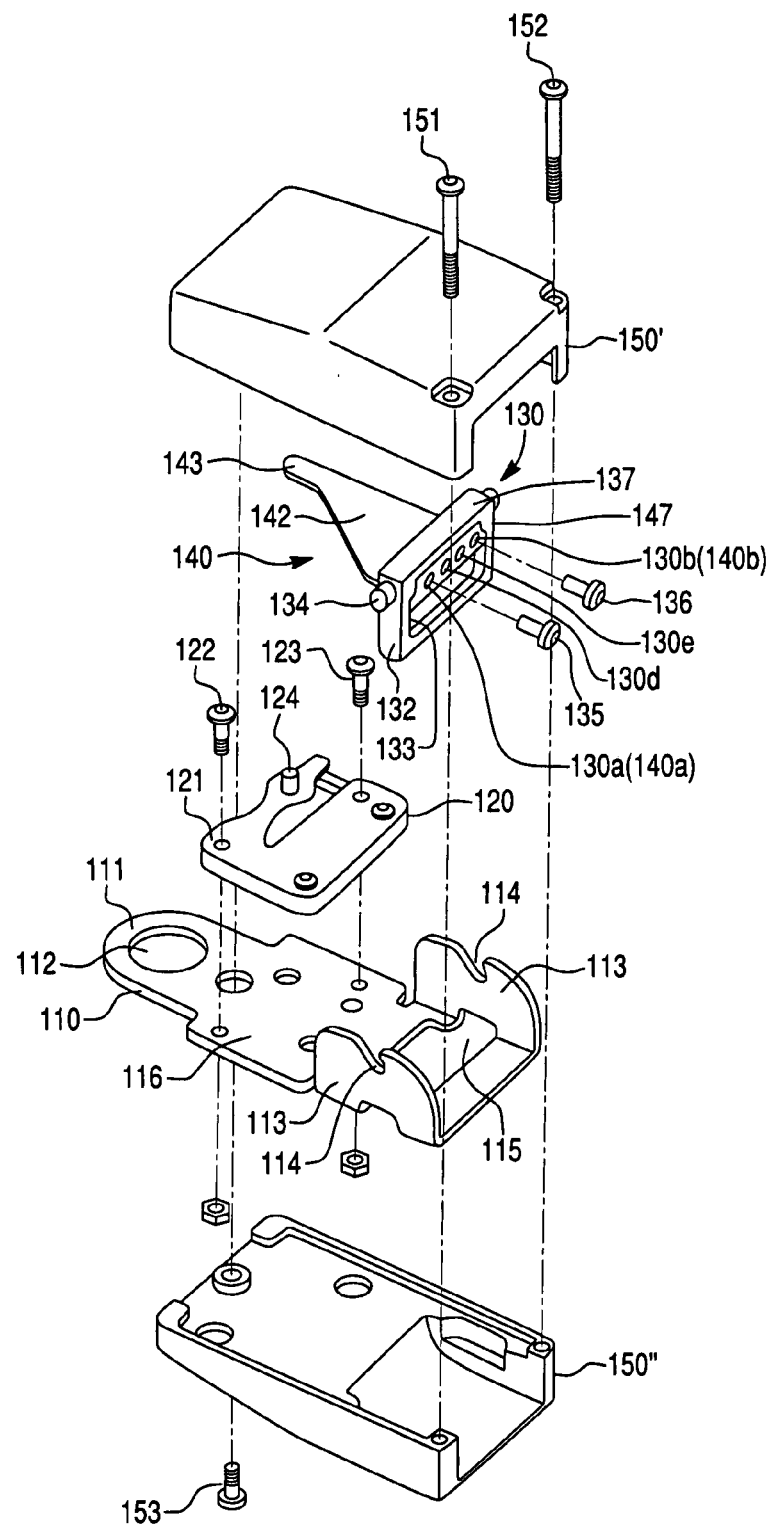
FIG. 17 is an exploded perspective view of the seat belt tension meter which is an embodiment of the present invention.
Figure 18:
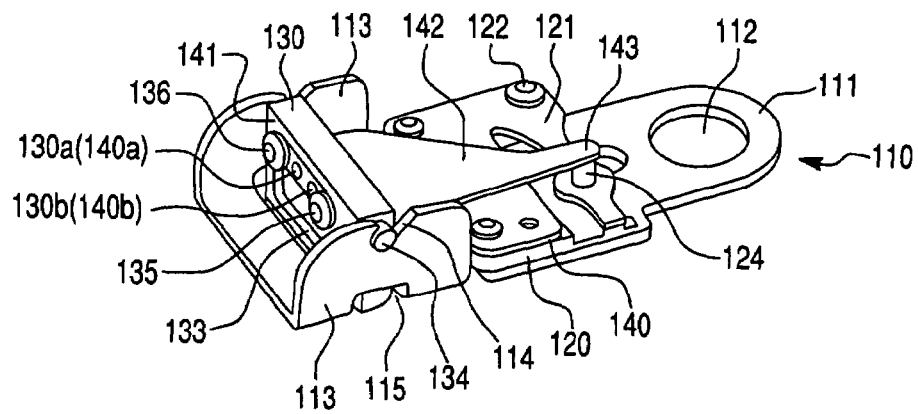
FIG. 18 is an assembly perspective view of the seat belt tension meter shown in FIG. 17.

FIG. 17 is an exploded perspective view of a seat belt tension meter which is an embodiment of the present invention; and FIG. 18 is an assembly perspective view thereof.

The principle of tension measurement in this embodiment does not differ from that of the tension meter shown in FIGS. 19 and 20, and the basic configuration is also the same. Therefore, the same component elements as in FIGS. 19 and 20 are assigned the same reference numerals. Provided however that, because improvements and changes in design have been made apart from those of the present invention, the shape and the member of each component element are somewhat different from those shown in FIGS. 19 and 20.

As shown in FIGS. 17 and 18, the seat belt tension meter roughly comprises a sensor mechanism a sensor mechanism having a base plate 110, a sensor base 120, a sensor plate 121, a shaft bar 130, and an arm spring 140; and covers 150' and 150".

The base plate 110 is a portion to be fixed to the vehicle body (anchor connecting member), such as a flat sheet made of a steel sheet (SPFH). A connecting portion 111 is formed at the tip of the base plate 110, and a hole 112 is pierced at the center thereof. An anchor bolt (not shown) for fixing the connecting portion 111 to the structure of the vehicle body is inserted into this hole 112. The outer peripheral edge of the connecting portion 111 is formed into a semicircular shape. A rising main sill 113 is formed on each of both sides in the width direction of the other end of the base plate 110. A substantially semicircular engagement notch 114 is formed on the upper edge of each main sill 113. A hole 115 is pierced in the middle between the two main sills 113. An intermediate portion 116 for mounting a sensor mechanism is provided in the middle between the connecting portion 111 and the portion having the two main sills formed thereon, and holes for inserting bolts and screws are pierced in this intermediate portion 116.

The sensor base 120 is made of an aluminum die-cast alloy or the like and is substantially a square-shaped member. The sensor plate 121 is attached to this sensor base 120, and bolts 122 and 123 are inserted into holes thereof so as to be fixed to the base plate 110. The bolts 122 and 123 penetrate also into holes of the sensor plate 121, thereby fixing the sensor plate 121 comprising a stainless steel sheet or the like to the sensor base 120.

Four strain gages are attached to the sensor plate 121, and an ASIC (Application Specific Integrated Circuit) for converting a detected value of this strain gage into an electric signal is mounted thereon. Furthermore, a joint pin 124 is attached to the sensor plate 121.

The shaft bar 130 forms a part of the sensor mechanism, and constitutes a webbing connecting member connected to the webbing. This is substantially a square-shaped member made of a zinc-cast alloy or the like. An upper member 131, a side member 132 and a lower member 133 are formed integrally therewith. A cylindrical rotary shaft 134 is similarly formed integrally with sides of the upper member 131. As shown in FIG. 17, two holes 130a and 130b are pierced in the right side surface of the upper member 131, and positioning projections 130d and 130e are provided.

The arm spring 140 is a sheet spring comprising a stainless steel sheet, and has a fixed portion 141 and an extending portion 142. The tip of the extending portion 142 serves as a contact point 143. The extending portion 142 is flat in shape, and forms an angle of 90° C. with the fixed portion 141. Four holes are pierced in the fixed portion. The extending portion 142 runs from the left side of FIG. 17 and comes into contact with the shaft bar 131 along the square-shaped inner upper surface (the bottom surface of the upper member 131). Two at the center from among the four holes of the fixed portion 141 folded upward engage with the positioning projections 130d and 130e provided on the shaft bar 130, whereby the positional relationship with the shaft bar 130 is determined.

Subsequently, the arm spring 140 is fixed to the shaft bar by screwing the tapping screws 135 and 136 into the holes 130a and 130b of the shaft bar 130 via the two outer holes 140a and 140b provided in the fixed portion 141 of the arm spring 140. By engaging the rotary member 134 of the shaft bar 130 with an engagement notch 114 of the main sill 113, the shaft bar 130 and the arm spring 140 are rotatably supported by the main sill 113 of the base plate 110. In this state, the contact point 143 which is the tip of the extending portion 142 extending into a flat shape comes into contact with the tip of the point pin 124 of the sensor plate 121.

The cover is divided into two, and an upper cover 150' and a lower cover 150" are fixed by screws 151, 152 and 153, thereby housing therein the main parts contributing to measurement of tension.

In the assembled state shown in FIG. 18, the rotary shaft member 134 of the shaft bar 130 fits into the engagement notch 114 formed in the two main sills 113 of the base plate 110 and are therein rotatably supported. The lower member 133 of the shaft bar 130 fits into a hole 115 of the base plate 110 to permit rotation within the range of the hole 115. The webbing is wound around the lower member 133 of the shaft bar 130 and connected thereto.

In FIG. 20, because the base plate 110 is fixed to the vehicle body, the shaft bar 130 rotates clockwise in the drawing around the rotary shaft member 134 fitting into the engagement notches 114 formed in the two main sills 113 of the base plate 110 upon application of tension to the webbing, whereby the arm spring 140 deforms and the contact point 143 thereof presses the point pin 124 of the sensor plate 121. This pressing force causes deformation also of the sensor plate 121, and an output corresponding to the tension is generated from the strain gage affixed thereto. It is therefore possible to measure the seat belt tension by measuring this output.

As is understood from the comparison of FIGS. 17 and 19, the arm spring 140 is fixed by tapping screws 135, 136 and 137 to the upper surface of the shaft bar 130 in the sensor mechanism of FIG. 19. In FIG. 17, in contrast, the arm spring is fixed by tapping screws 135 and 136 to a side of the shaft bar 130 (the side in the thickness direction), and this is a first difference.

While various shapes are conceivable for the shaft bar 130, the size is larger lengthwise and breadthwise (crosswise of the square shape) and the size is smaller in the thickness direction perpendicular to the square in all cases. When preparing a member having such a shape by die casting, therefore, the mold is divided into two in the thickness direction in which the mold is smaller in size, and casting is carried out after joining these two halves of the mold. As a result, it is difficult to form holes by die casting on the upper surface of the shaft bar 130 in the joining direction of the mold halves. In the product shown in FIG. 19, therefore, it has been the practice to prepare holes 130a to 130c by machining.

In the embodiment of the present invention shown in FIG. 17, in contrast, the position where the holes 130a and 130b are formed does not agree with the joining direction of the mold. It is therefore easy to form holes by die casting. It is not therefore necessary to prepare holes by machining, thus enabling to omit the machining step required in the conventional art.

The second difference suggested by the comparison of FIGS. 17 and 19 is as follows. In FIG. 19, the extending portion 142 which is the free end of the arm spring 140 has a curved surface and is in contact with the point pin 124. In FIG. 17, the extending portion 142 which is the free end of the arm spring 140 is flat in shape and is in contact with the point pin 124. As a result, transmission of force to the sensor plate 21 accomplished from the shaft bar 130 via the arm spring 140 is more smooth, with a decreased hysteresis and an improved tension measuring accuracy.

The extending portion 142 of the arm spring 140 runs from the left side (one side in the thickness direction of the shaft bar) to the right side (the other side) along the underside of the upper member 131 of the shaft bar 130, i.e., the inside of the square portion. It is folded upward here, and the fixed portion 141 is fixed to a side (a side of the square-shaped portion of the shaft bar) of the upper member 131. This is a third difference.

As a result, the position of attachment of the arm spring 140 becomes lower than that in FIG. 19. Even with a flattened free end of the arm spring 140, it is not necessary to increase the height of the position of the sensor plate 121, and hence to use a thicker base plate 120.

In the embodiment shown in FIG. 17, the arm spring 40 is wound from a side to the other side in the thickness direction of the shaft bar 130 and folded and fixed here. In place of this, the fixed portion 141 may be fixed to a side opposite to that of the upper member 131 in FIG. 17. However, the fixing method shown in FIG. 17 permits easier screw-fixing operation.

The features shown may be selectively adopted. For example, only the mounting method of the arm spring 40 on the shaft bar 130 shown in FIG. 17 may be adopted, using the shape of the arm spring 140 shown in FIG. 19, and corresponding advantages are available.

In FIG. 17, the arm spring 140 is passed under the upper member 131 and fixed to a side of the upper member 131. By passing it on the upper side of the upper member 131 and fixing it to a side of the upper member 131, corresponding advantages are also available.

For the necessity to attach to the vehicle body, such a seat belt tension sensor must be downsized as far as possible, and for this purpose, the width should also be preferably the smallest possible.

Figure 22A:
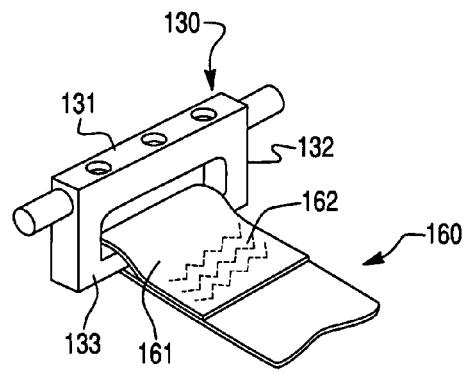
FIG. 22 illustrates a typical method for attaching the webbing to the shaft bar conventionally applied.
Figure 22B:
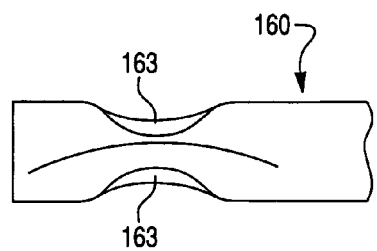
Figure 22C:
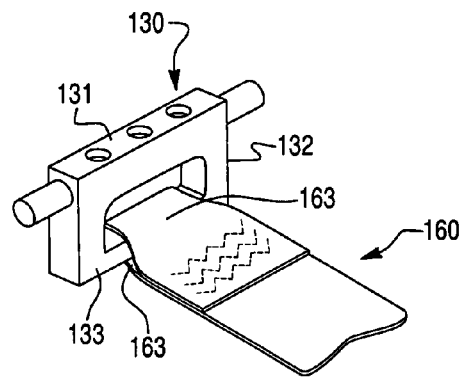

For combining the webbing with the shaft bar by winding the former on the latter, a method as shown in FIG. 22 has been adopted. In FIG. 22, the same component elements as in FIGS. 19 and 20 are assigned the same reference numerals.

FIG. 22(*a*) illustrates a combining method of winding the leading end of the webbing 160 as it is on the lower member 133 of the shaft bar 130, folding the same back, stitching the folded portion 161 to form a seam 162. In this method, which is simple, the transverse width of the center hole of the shaft bar 130 must be larger than the width of the webbing, thus posing a problem of a larger-scale seat belt tension sensor.

FIGS. 22(*b*) and 22(*c*) illustrate a combining method of folding back into two the wound portion onto the lower member 133 of the shaft bar 130 near the leading end of the webbing, folding the same by winding on the lower member 133, and stitching the folded portion 161, thereby forming a seam 162. This method is advantageous in that the transverse width of the center hole of the shaft bar 130 can be reduced to about a half the width of the webbing, permitting reduction of the transverse width of the seat belt tension sensor.

This method has, however, problem in that the shape of the portion of the webbing wound onto the lower member 131 is unstable, friction being caused with the shaft bar 130, leading to a larger error in measurement of tension. Another problem is the contact of the folded portion with the cover, and the friction produced therefrom causing a tension measuring error.

The improvement disclosed herein was developed in view of these circumstances, and has an object to provide a seat belt tension sensor which permits, in spite of a compact size, avoidance of occurrence of such a friction, and detection of an accurate tension.

Accordingly, a seat belt tension sensor is provided. The sensor is installed in an anchor portion where an end of a seat belt is fixed to the vehicle body, having an anchor connecting member connected to the vehicle body, a webbing connecting member connected to the seat belt, and a sensor mechanism which detects a force acting between these members, the webbing being inserted into a hole provided in the webbing connecting member, and connected by folding back the same; wherein the portion of the webbing inserted into the hole is folded back from the both sides in the width direction, and the width is reduced by bonding the folded portion with the portion not folded.

The width of the portion of the webbing inserted into the hole provided in the webbing connecting member is reduced by folding back from both sides in the width direction. It is therefore possible to reduce the width of the hole of the webbing connecting member into which the webbing is inserted, and hence to reduce the size of the seat belt tension sensor. The portions folded from both sides in the width direction are bonded to the portion not folded. This portion is therefore stable in shape, thus permitting reduction of friction with the webbing connecting member or with the cover. It is thus possible to accurately measure the seat belt tension.

Figure 21A:
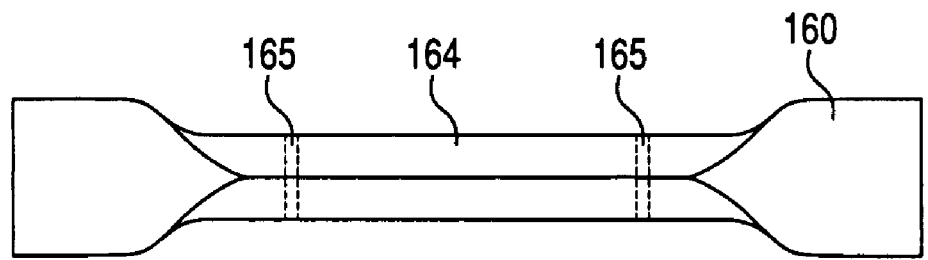
FIG. 21 illustrates the shape of the webbing leading end and the state of connection to the shaft bar in an embodiment of the present invention.
Figure 21B:
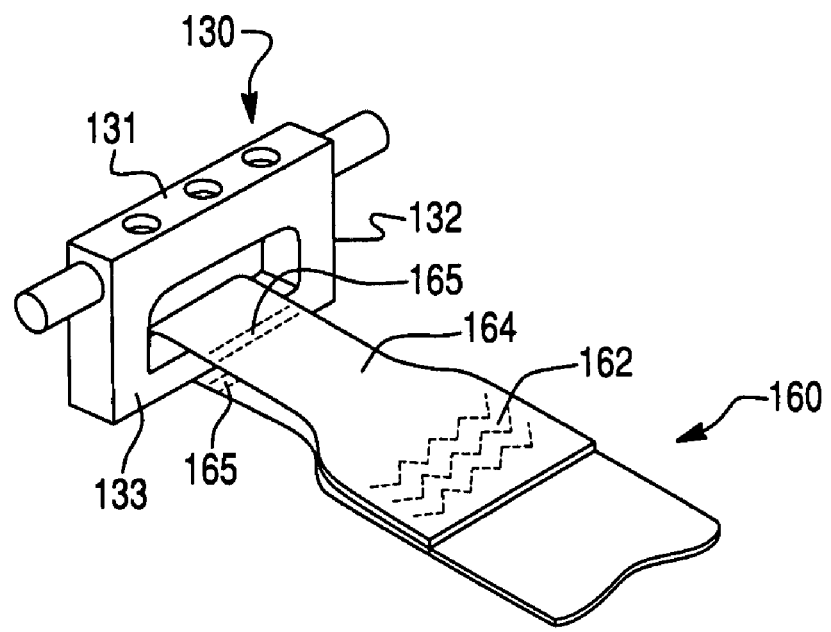

FIG. 21 illustrates the shape of the leading end of the webbing and the connecting state to the shaft bar in an embodiment of the present invention. The webbing arrangement shown in FIG. 21 can be used in combination with any of the various embodiments of the seat belt tension sensor disclosed and is substantially similar in many respects to the embodiment shown in FIG. 6, discussed above.

FIG. 21(*a*) illustrates an end of the webbing 160 prior to attaching to the hole of the shaft bar 130. Portions near the ends of the webbing 160 are folded into two from both sides in the width direction to form bend portions 164. In the bent portion 164, the webbing is doubled.

Near the right and left ends of the bent portions 164, the doubled portions are stitched to each other to form seams 165. The seam 165 has an object to prevent the bent portion 164 from opening to recover the original shape, and may be provided at three or more points as required. In place of stitching, overlapping webbings may be secured by bonding. Any means may be applied so far as such means permits prevention of the bent portion 64 from opening to recover the original shape. The bent portion 164 corresponds to the portion of the shaft bar 130 wound on the lower member 133 and folded back.

FIG. 21(*b*) is a perspective view illustrating a state in which the webbing 160 is connected to the shaft bar 130. The bent portion 164 of the webbing 160 is wound on the lower member 133 of the shaft bar 130, folded back through the hole of the shaft bar 130, and stitched at the seam 162 as in the conventional art, thereby completing connection. At the portion connected to the shaft bar 130, therefore, the webbing has a width reduced to about a half the width of the other portions, thus making it possible to reduce the width of the shaft bar 130. The bent portion 164 of the webbing 160 wound on the shaft bar 130 has a shape fixed by the seam 165, thus preventing expansion of this portion. This eliminates the risk of occurrence of friction with the shaft bar 130 or with the cover. It is thus possible to accurately measure the seat belt tension.

Thus, as described above, it is possible to reduce the size of the belt tension sensor, prevent occurrence of friction, and accurately measure the seat belt tension.

Figure 27:
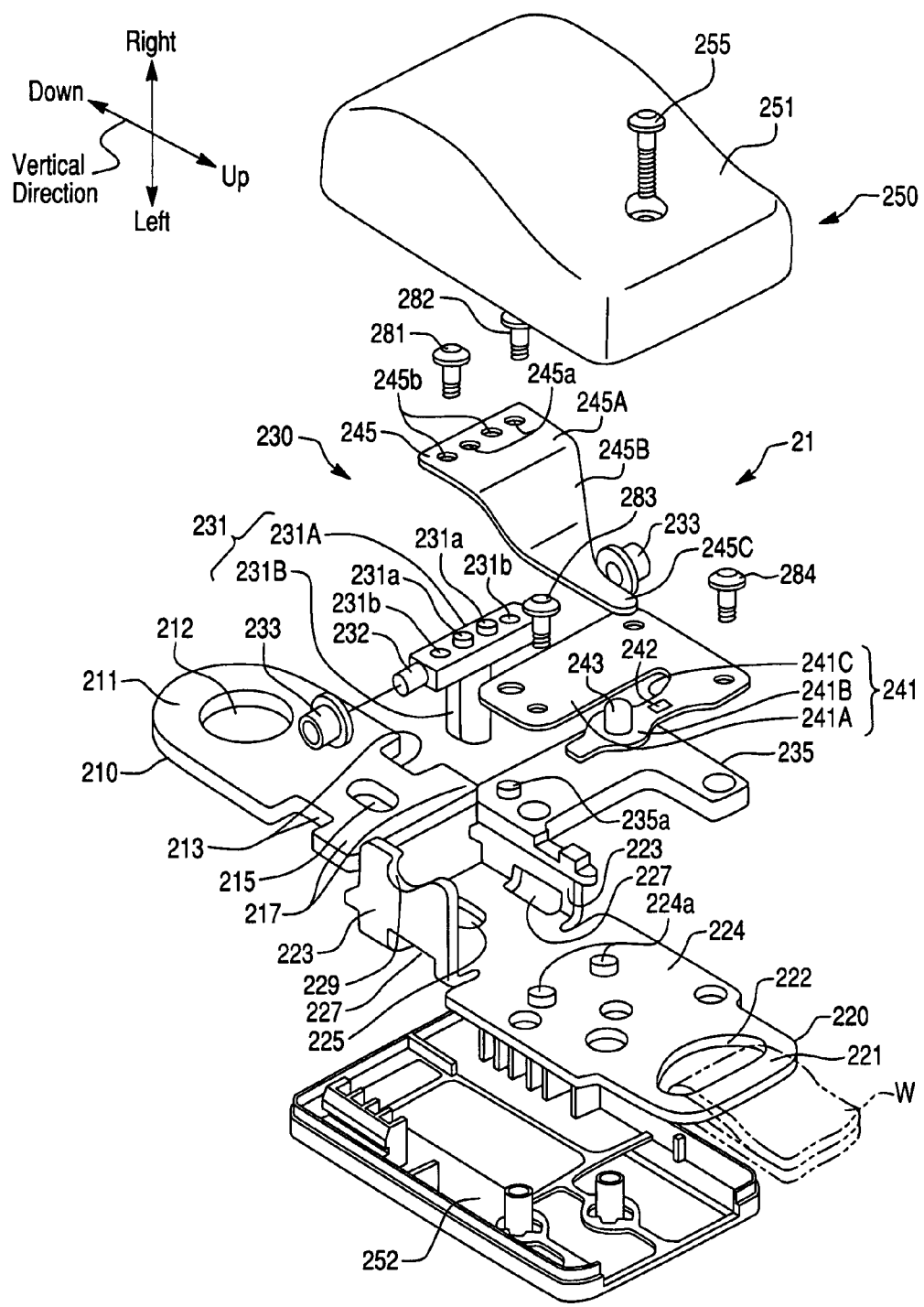
FIG. 27 is an exploded perspective view illustrating the seat belt tension meter of an embodiment of the prior device.
Figure 28A:
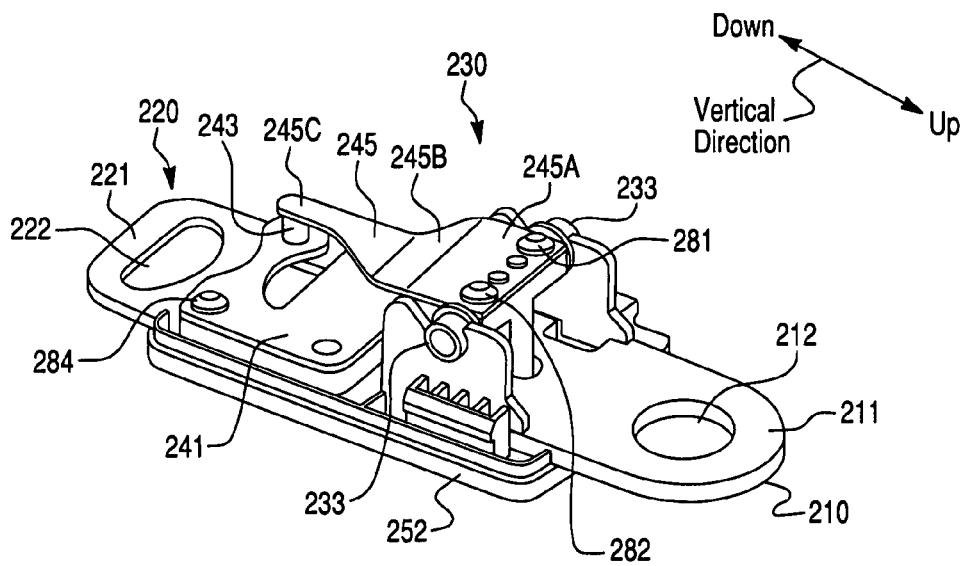
FIG. 28 is a perspective view illustrating the structure of the seat belt tension meter shown in FIG. 27.
Figure 28B:
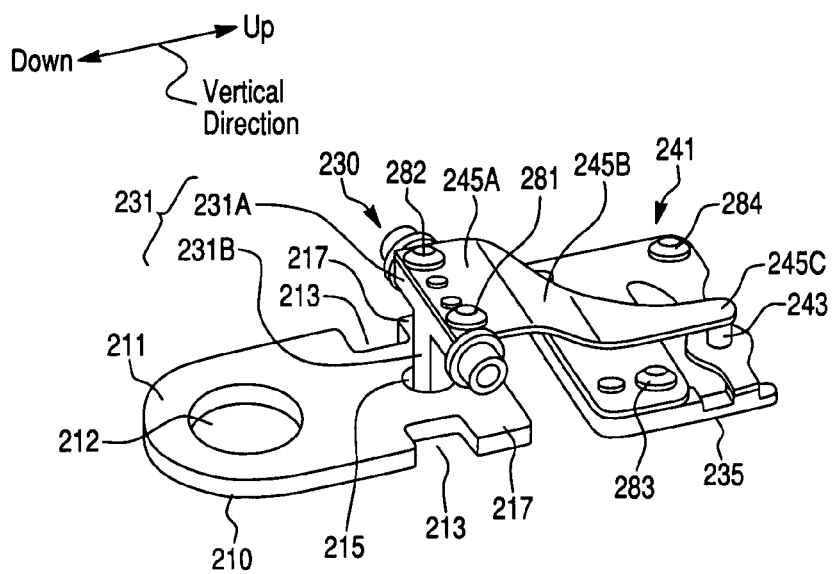
Figure 29:
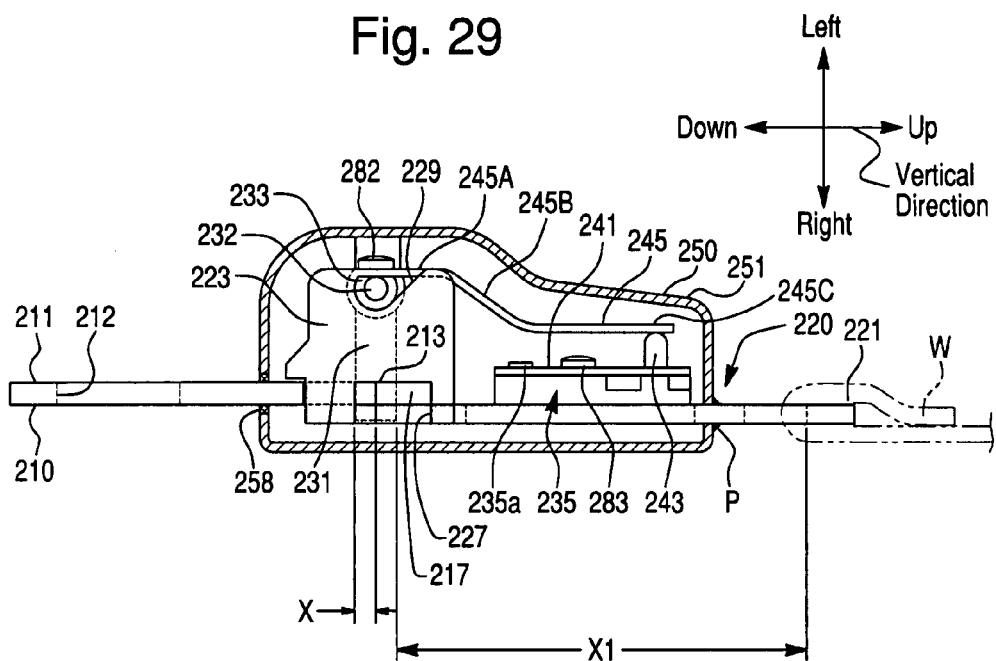
FIG. 29 is a side sectional view illustrating a state in which the belt tension does not act on the seat belt tension meter shown in FIG. 27.
Figure 30:
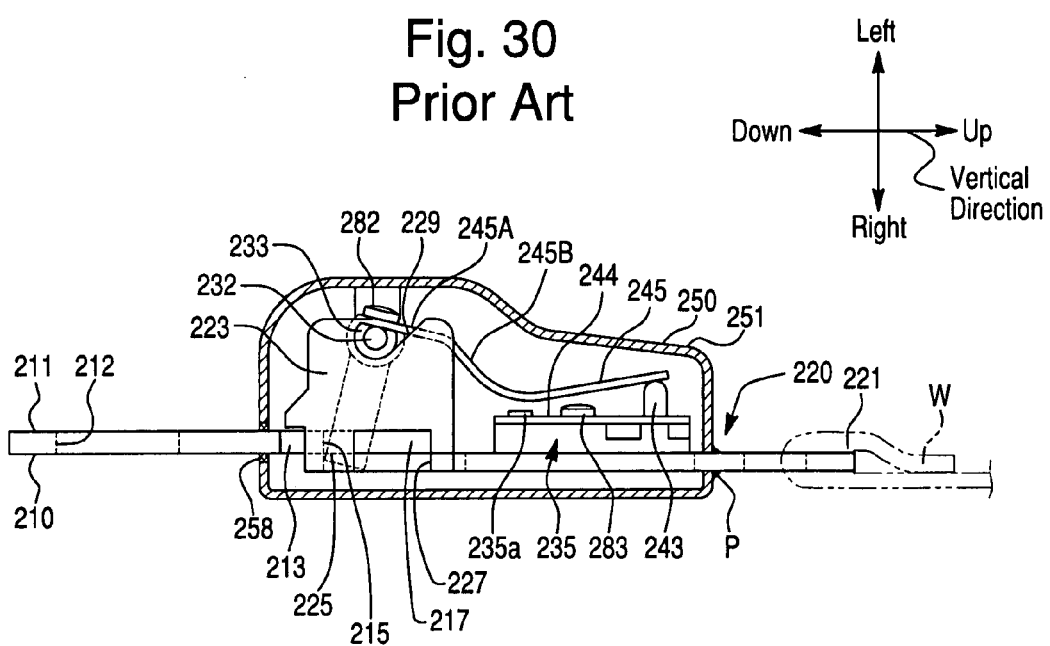
FIG. 30 is a side sectional view illustrating a state in which the belt tension acts on the seat belt tension meter shown in FIG. 27.

Japanese Patent Publication JP2002-145017 (incorporated herein by reference) discloses a seat belt tension (hereinafter referred to as the "prior device"). Embodiments of the prior device will now be described with reference to the drawings. FIG. 27 is an exploded perspective view illustrating the seat belt tension meter of an embodiment of the prior device. FIGS. 28(*a*) and 28(*b*) are perspective views illustrating the inner structure (including a sensor mechanism) of a cover of the seat belt tension meter shown in FIG. 27. FIG. 29 is a side sectional view illustrating a state in which no belt tension acts on the seat belt tension meter shown in FIG. 27. FIG. 30 is a side sectional view illustrating the state of the seat belt tension meter shown in FIG. 27 during application of a belt tension.

The seat belt tension meter 1 shown in these drawings is installed in the anchor section which fixes an end of the webbing W of the seat belt to the vehicle body. The seat belt tension meter 1 roughly comprises the following components: (1) Anchor connecting member 210 having a connecting section 211 connected to a structure of the vehicle body; (2) Webbing connecting member 220 having a connecting section 221 connected to the seat belt (webbing) W; (3) Sensor mechanism 230 which is arranged so as to connect the anchor connecting member 210 and the webbing connecting member 220, and measures a force acting on these members; and (4) Cover 250 covering the sensor mechanism 230.

These components will now be individually described in detail. The terms "up, down, right and left" shall mean "up, down, right and left" (indicated by arrows in the drawings) in the posture upon actual assembly of the meter 1 to the vehicle body unless otherwise specified. When there is a specification "in the drawing", these terms shall mean "up, down, right and left" in the drawing.

The anchor connecting member 210 comprises, for example, a flat sheet made of a steel sheet (SPFH). The lower end of this member 210 is the connecting section 211 connected to the structure (not shown) of the vehicle body. A hole 212 is pierced in the center portion of this connecting section 211. An anchor bolt (not shown) for fixing the connecting section 211 to a structure of the vehicle body is inserted into this hole 212. The outer peripheral edge of the connecting section 211 is formed into a semicircular shape.

A cavity 213 is formed on each of the sides in the width direction near the upper end (on the side opposite to the connecting section 211) of the anchor connecting member 210. Engagement sections 217 projecting to both sides are formed on these cavities 213. In the assembled state, these engagement sections 217 engage slidably with the webbing connecting member 220 into throughholes 227 of the webbing connecting member 220 described later.

Furthermore, a long hole 215 is pierced in the center portion on the upper end side (between the both cavities and the both engagement sections 217) of the anchor connecting member 210. In the assembled state, a tip portion 231B of the shaft bar 231 of the sensor mechanism 230 described later is press-inserted into this long hole 215.

The webbing connecting member 220 is made of a carbon steel sheet (for example), and has a connecting section 221 having an upper end connected to the webbing W. A hole 222 into which the webbing is inserted is pierced at a position near the upper end of the connecting section 221. Rising main sills 223 are formed on both sides in the width direction of the lower end (side opposite to the connecting section 221) of the webbing connecting member 220. Throughholes 227 running to a side are formed at the lower end of the two mail sills 223 in FIG. 27.

The above-mentioned engagement section 217 of the anchor connecting member 210 engage with these throughholes 227. In the state of engagement of these components, a gap represented by a symbol X in FIG. 7 exists between the engagement section 217 and the throughholes 227. The webbing connecting member 220 and the anchor connecting member 210 can vertically slide within the range of this gap X.

A long hole 225 is pierced between the two main sills 223 of the webbing connecting member 220. This long hole 225 overlaps the long hole 215 of the anchor connecting member 210. On the other hand, substantially circular engagement notches 229 are formed on the upper edges of the two main sills 223 in FIG. 27. In the assembled state, tip portions 231B of the shaft bar 231 of the sensor mechanism 230 described later are inserted under pressure into these long holes 225 and 215. Shaft sections 232 projecting to sides having externally fitted bearings 233 of a base section 231A of the shaft bar 231 projecting in a T-shape relative to the tip portion 231B of the shaft bar 231 fit into the space between the engagement notches 229, as described later.

A sensor base 235 of the sensor mechanism 230 described later is arranged in the intermediate section 224 between the connecting section 221 of the webbing connecting member 220 and the main sills 223. In this intermediate section 224, three inserting holes for machine screws B3, B4 and B5 are formed, and two projections 224*a* for positioning the sensor base 235 are formed.

The sensor mechanism 230 has a shaft bar 231, a sensor base 235, a sensor plate 241 and an arm spring 245. The shaft bar 231 is a T-shaped member made of a zinc die-cast alloy (for example), having a base portion 231A and a tip portion 231B. Shaft sections 232 projecting sideways are formed at both ends of the base portion 231A of the shaft bar 231. Bearings made of (for example) polyoxymethylene external fit to these shaft sections 232.

Two projections 231*a* are formed at the surface center of the base section 231A of the shaft bar 231. The projections 231*a* are for positioning the arm spring 245 and engages with a hole 245*a* of the arm spring 245. Threaded holes 231*b* are formed on both sides with the projections 231*a* of the base section 231A of the shaft bar in between. Machine screws B1 and B2 integrally jointing the shaft bar 231 and the arm spring 245 are screwed into these threaded holes 231*b*.

In the assembled state, the base section 231A of the shaft bar 231 fits into the engagement notches 229 of the two main sills 223 of the webbing connecting member 220 via the bearing 233 and is installed there. The tip portion 231B of the shaft bar 231 is inserted into the long hole 215 of the anchor connecting member and the long hole 225 of the webbing connecting member 220. In this state, the shaft bar 231 is rotatable within the range of the long hole 215 around the shaft center (shaft section 232 and the shaft center of the bearing 233) of the base section 231A.

The sensor base 235 is a substantially U-shaped member made of (for example) aluminum die-cast alloy. This sensor base 235 is positioned and arranged by the projection 224*a* on the surface of the intermediate section 224 of the webbing connecting member 220. A sensor plate 241 made of a stainless steel sheet (for example) is arranged on the surface of this sensor base 235. The sensor plate 241 has a fixed portion 241A under the notch 241C and a strain detection arm 241B on the upper side of the notch 241C. The fixed portion 241A is positioned and arranged by a projection 235*a* on the sensor base 235.

The strain detection arms 241B are arranged in a state in which the arm 241B is installed at both ends of the U-shaped sensor base 235. Four strain gages 242 are affixed to the strain detection arms 241B, and ASICs (Application Specific Integrated Circuit, not shown) for converting detection values of the strain gages 242 into electric signals are attached. Furthermore, a point pin 243 is provided on the surface of the strain detection arm 241B.

An arm spring 245 is installed between the base section 231A of the shaft bar 231 and the point pin 243 of the sensor plate 2241. The arm spring 45 is a sheet spring made (for example) of stainless steel, and has a fixed portion 245A and an extending portion 245B extending downward diagonally from this fixed portion 245A. The tip of the extending portion 245B forms a contact point 245C. Two inner holes 245a engaging with the projections 231a of the base portion 231A of the shaft bar 231 and two outer holes 245b into which the machine screws B1 and B2 are inserted are formed in the fixed portion 245A. The arm spring 245 is screw-fixed by tightening the machine screws B1 and B2 in the state in which it is positioned by the projection 231a of the base portion 231A of the shaft bar 231. In the state in which the fixed portion 245A is fixed, the contact point 245C comes into contact with the tip of the point pin 243 of the sensor plate 241.

The cover 250 comprises an upper cover 251 and a lower cover 252. A space for housing the sensor mechanism 230 is formed inside the upper cover 251. The lower cover 252 is positioned on the back of the webbing connecting member 220. The upper cover 251 and the lower cover 252 are fixed by screws 255 in a state in which the webbing connecting member 220, the anchor connecting member 210 and the sensor mechanism are housed inside. In the assembled state, the webbing connecting member 220, and sensor base 235 and the sensor plate 241 are superposed in the lower cover 252, and the cover is tightened with screws B3 and B4.

The cover 250, the webbing connecting member 220, the sensor base 235 and the sensor plate 241 are therefore integrated, and there occurs practically no relative displacement between them. On the other hand, these parts slide relative to the anchor connecting member 210. As shown in FIGS. 29 and 30, the space between the webbing connecting member 220 and the cover 251 is sealed with a resin p. On the other hand, the space between the anchor connecting member 210 and the cover 251 is filled with rubber packing 258.

Operation of the seat belt tension meter having the above-mentioned configuration will now be described. FIG. 31 is an operation flowchart of the seat belt tension meter of the prior device. As shown in FIG. 7, when a tension is not applied to the webbing W, the tip portion 231B of the shaft bar 231 of the sensor mechanism 230 is in a upright state relative to the anchor connecting member 210 and the webbing connecting member 220. In this case, the upper edge of the engagement section 217 of the anchor connecting member 210 is positioned at the upper end in the throughhole 227 of the webbing connecting member 220, and a gap X is maintained between the lower edge of the engagement section 217 and the lower end of the throughhole 227. The arm spring 245 of the sensor mechanism 230 keeps its original shape. The tip portion 231B of the shaft bar 231 is inserted substantially straight into the long hole 215 of the anchor connecting member 210.

When a tension is applied to the webbing W from this state (step S1 in FIG. 31), the webbing connecting member 220 is pulled to the right in FIGS. 29 and 30 (step S2 in FIG. 31). Then, the sensor mechanism 230 and the cover 250 integral with the webbing connecting member 220 are also pulled simultaneously to the right in FIGS. 29 and 30, and they displace by sliding relative to the anchor connecting member 210. Then, the long hole 215 of the anchor connecting member 210 always fixed to the side of the vehicle body hits the shaft bar 231 of the sensor mechanism 230, and a downward force acts on the tip portion 231B of the shaft bar 231, with the anchor connecting member 210 serving as a point of force. As a result, the shaft bar 231 rotates at the engagement notch 229 of the main sill 223 of the webbing connecting member 220, with the bearing 233 externally attached to the shaft portion 232 of the base portion 231A as a fulcrum (step S3 in FIG. 31).

Figure 8:
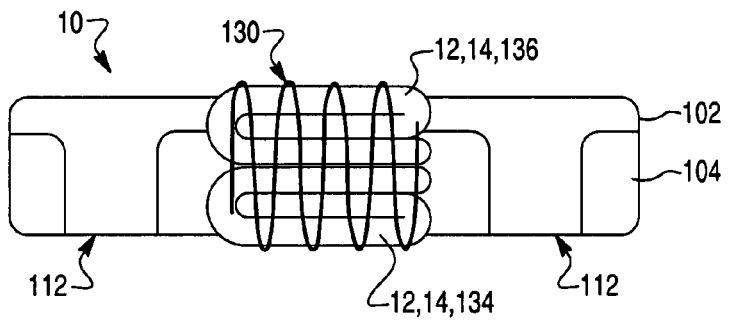
FIG. 8 illustrates a detail of a portion of a loop of webbing secured by a second set of stitches, for the embodiment of FIG. 6.

Upon rotation of the shaft bar 31, the arm spring fixed to it moves in conjunction therewith, and as shown in FIG. 8, the extending portion 245B is bend and deforms. At the time of such a bending deformation, the arm spring 245 is in a state supported between the fixed portion 245A (fixed end) fixed to the base portion 231A of the shaft bar 231 and the contact point 245C (free end) in contact with the point pin 243 of the sensor plate 241, and this force is transmitted to the point pin 243 (step S4 in FIG. 31).

When the force is transmitted to the point pin 243, a strain is generated in the train detection arm 241B of the sensor plate 241 (step S5 in FIG. 31). This strain is detected by the strain gage 242, and the detection value is converted into an electric signal and measured (step S6).

In step S2 described above, the amount of relative displacement of the webbing connecting member 220 and the anchor connecting member 210 is limited within the range of the gap X. As shown in FIG. 8, the maximum displacement occurs when the engagement section 217 of the anchor connecting member 210 comes into contact with the lower end of the throughhole 227 of the webbing member 220, and the force acting on the webbing connecting member 220 is directly transmitted to the anchor connecting member 210. The transmitted load (stopper load) in this case is about 220 kg. By thus limiting the amount of displacement, the load applied to the sensor plate 241 is also limited.

However, the prior device had the following problems. The first problem is as follows. In a state in which the anchor connecting member 210 including the engagement section 217 gets on the webbing connecting member 220 serving as a base, the long hole 215 thereof engages with the tip portion 231 of the shaft bar 231 to transmit the tension to the shaft bar 231. When a large tension is applied, therefore, a rotational moment is generated along with the presence of a shift between the webbing connecting member 220 and the anchor connecting member 210, and this causes a compound force to occur. Occurrence of the compound force prevents the corresponding part of tension from being transmitted to the shaft bar 231, thus making it impossible to accurately measure the tension.

The second problem lies in that the webbing W may sometimes become diagonal by about ±10° to the webbing connecting member 220. When the webbing W becomes diagonal to the webbing connecting member 220, a rotational moment occurs between the webbing connecting member 220 and the anchor connecting member 210, thus causing a compound force. As a result, the corresponding part of tension is no longer transmitted to the shaft bar, making it impossible to accurately measure the tension.

The present invention has been developed in view of these circumstances, and has an object to provide a seat belt tension meter which permits reduction of the generated compound force and accurate measurement of tension.

A seat belt tension meter installed in an anchor section which fixes an end of the seat belt to the vehicle body is provided. The meter comprises an anchor connecting member connected to the vehicle body, a webbing connecting member connected to the seat belt, and a sensor mechanism which is arranged so as to stride over the anchor connecting member and the webbing connecting member, and detects a force applied between these members; wherein the surface on which the anchor connecting member is connected to the vehicle body and the surface on which the webbing connecting member is connected to the seat belt are in the same plane.

The surface on which the anchor connecting member is fixed to the vehicle body and the surface on which the webbing connecting member is connected to the seat belt are in the same plane. Therefore, even when a large tension occurs, no rotational moment is produced between the anchor connecting member and the webbing connecting member. No compound force is therefore produced. The tension is thus accurately transmitted to the sensor mechanism, thus permitting accurate measurement of the tension.

The distance between the point at which the webbing connecting member transmits the force to the sensor mechanism and the point at which the seat belt is connected to the webbing connecting member may be shorter than the distance between the point at which the webbing connecting member transmits the force to the sensor mechanism and the point at which the anchor connecting member is connected to the vehicle body.

As described above, the seat belt (webbing) may become diagonal to the webbing connecting member. This causes occurrence of a rotational moment. The rotational moment becomes larger according as the distance between the point at which the webbing connecting member transmits the force to the sensor mechanism and the point at which the seat belt is connected to the webbing connecting member is longer.

In this seat belt tension meter, the force acts on the point at which the seat belt is connected to the webbing connecting member and on the point at which the anchor connecting member is connected to the vehicle body. The distance from the latter to the point at which the force is transmitted to the sensor mechanism is shorter than the distance from the former to the point at which the force is transmitted to the sensor mechanism. As a result, the compound force produced when the seat belt becomes diagonal to the webbing connecting member becomes smaller than in the reverse case, thus permitting accurate transmission of the tension to the sensor mechanism.

The sensor mechanism may include (a) a shaft bar which is arranged so as to be rotatably held by the webbing connecting member and works in conjunction with a relative movement between the anchor connecting member and the webbing connecting member resulting from a change in seat belt tension; (b) an arm spring which is attached to the shaft bar, deforms along with rotation of the shaft bar, and transmits a force corresponding to the rotation of the shaft bar to a sensor plate; and (c) a sensor plate which is arranged on the webbing connecting member via a sensor base, deforms by being pushed by the arm spring, and has a strain gage affixed thereto; and the anchor connecting member has a structure in which the portion in engagement with the shaft bar has a ramp with the surface on which the anchor connecting member is fixed to the vehicle body, and runs on the webbing connecting member.

The webbing connecting member constitutes the base by which the shaft bar is rotatably held. The anchor connecting member engages with the shaft bar, and upon application of a tension, causes rotation of the shaft bar. As a result, the arm spring having the shaft bar attached thereto pushes the sensor base, this causing deformation of the sensor base. The deformation of the sensor base enables to obtain an output corresponding to the tension from the strain gage affixed thereto.

Accordingly, it is possible to achieve a structure in which the anchor connecting member slides on the webbing connecting member serving as the base. It is therefore possible to stabilize the relationship between the anchor connecting member and the webbing connecting member. Since, in the anchor connecting member, the portion engaging with the shaft bar has a ramp from the surface on which it is fixed to the vehicle body and the surface on which the webbing connecting member is connected to the seat belt can be in the same plane while maintaining the structure in which the anchor connecting member slides on the webbing connecting member serving as the base, thus displaying the advantages of the above-mentioned first and second means.

The sensor mechanism may include (a) a shaft bar which is arranged so as to be rotatably held by the anchor connecting member, and works in conjunction with a relative movement between the anchor connecting member and the webbing connecting member resulting from a change in seat belt tension; (b) an arm spring which is attached to the shaft bar, deforms along with rotation of the shaft bar, and transmits a force corresponding to the rotation of the shaft bar to a sensor plate; and (c) a sensor plate which is arranged on the anchor connecting member via a sensor base, deforms by being pushed by the arm spring, and has a strain gage affixed thereto; and the webbing connecting member has a structure in which the portion connected to the shaft bar has a ramp with the surface connected to the seat belt, and runs on the anchor connecting member.

The anchor connecting member constitutes the base by which the shaft bar is rotatably held. The webbing connecting member engages with the shaft bar, and upon application of a tension, causes rotation of the shaft bar. As a result, the arm spring having the shaft bar attached thereto pushes the sensor base, this causing deformation of the sensor base. The deformation of the sensor base enables to obtain an output corresponding to the tension from the strain age affixed thereto.

Thus, it is possible to achieve a structure in which the webbing connecting member slides on the anchor connecting member serving as the base. It is therefore possible to stabilize the relationship between the anchor connecting member and the webbing connecting member. Since, in the webbing connecting member, the portion engaging with the shaft bar has a ramp from the surface on which it is fixed to the seat belt, the surface on which the anchor connecting member is fixed to the vehicle body and the surface on which the webbing connecting member is connected to the seat belt can be in the same plane while maintaining the structure in which the webbing connecting member slides on the anchor connecting member serving as the base, thus displaying the advantages of the above-mentioned first and second means.

The sensor base may be placed on the anchor connecting member. The length of the webbing connecting member can accordingly be reduced, thus permitting easy achievement of the above-mentioned second means.

Figure 23:
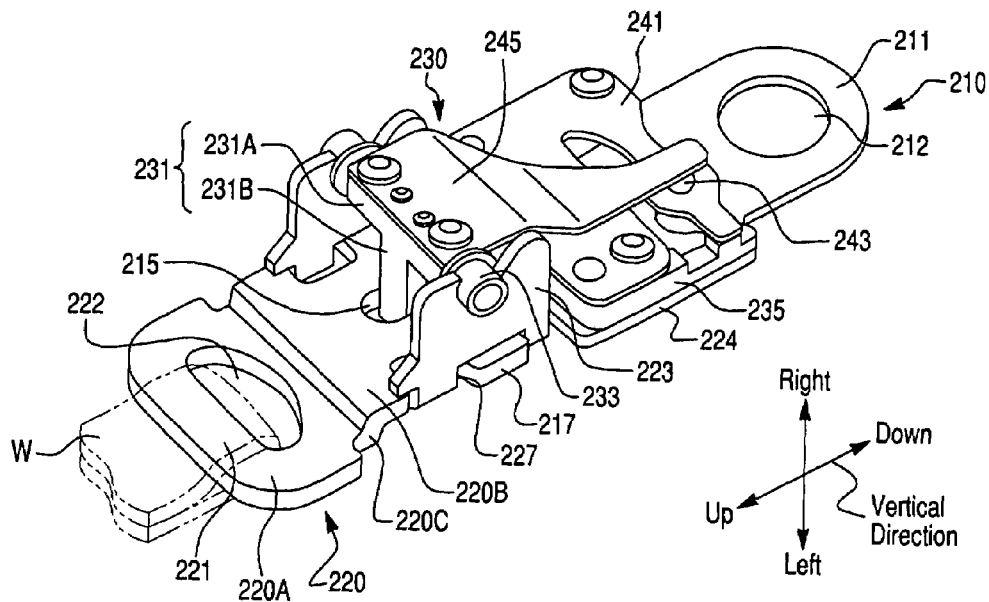
FIG. 23 is a perspective view illustrating an embodiment of the seat belt tension meter of the present invention.
Figure 24:
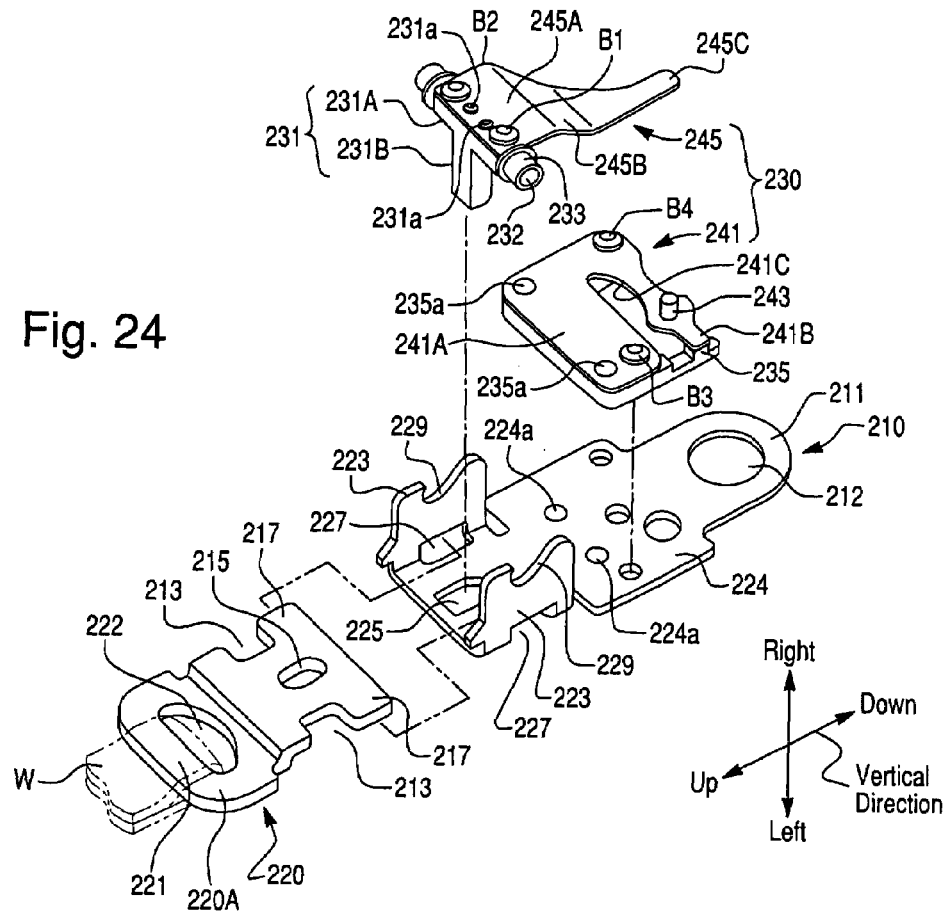
FIG. 24 is an exploded perspective view of the seat belt tension meter shown in FIG. 23.

Embodiments of the present invention will now be described with reference to the drawings. FIG. 23 is a perspective view illustrating a seat belt tension meter of an embodiment of the present invention; and FIG. 24 is an exploded perspective view thereof. The basic structure and the principle of tension measurement of the present invention are the same as those of the prior device, except, however, the following two differences: (1) In the prior device, the webbing connecting member 220 constituted the base plate, and the sensor mechanism 230 was mounted thereon. In the present invention, in contrast, the anchor connecting member 210 constitutes the base plate, and the sensor mechanism 30 is connected thereon; and (2) The webbing connecting member 220 has a ramp. As a result, the flat portion where the connecting section 221 which is the portion in which the webbing connecting member is connected to the seat belt (webbing) and the flat portion where the hole 210 for inserting the anchor bolt in the anchor connecting member are in the same plane.

In other words, as shown in FIGS. 29 and 30, the seat belt tension meter comprises the anchor connecting member 210, the webbing connecting member 220, the sensor mechanism 230 and the cover in this embodiment as well as in the prior device. The cover is not shown in the drawings. The anchor connecting member 210, the webbing connecting member 220, and the sensor mechanism 230 will now be described in detail.

The anchor connecting member 210 comprises, for example, a flat sheet made of steel (SPFH). The under side of this member 210 forms the connecting section 211 connected to a structure (not shown) of the vehicle body. A hole 212 is pierced in the center portion of this connecting section 211. An anchor bolt (not shown) for fixing the connecting section 211 to the structure of the vehicle body is inserted into this hole 212. The outer peripheral edge of the connecting section 211 is formed into a semi-circular shape.

Rising main sills 223 are formed at both ends in the width direction of the upper side (side opposite to the connecting section 211) of the anchor connecting member 210. Throughholes 227 running sideways are formed at the lower end of the two main sills 223 in FIG. 23.

An engagement section 217 described later of the webbing connecting member 220 engages with these throughholes 227. In the engagement state of these components, a gap identical with that represented by a symbol X in FIG. 3 is present between the engagement section 217 and the throughholes 27. The webbing connecting member 220 and the anchor connecting member 210 can slide vertically relative to each other within the range of this gap X.

A long hole 225 is pierced between the two main sills 223 of the anchor connecting member 210. This long hole 225 overlaps the long hole 215 of the webbing connecting member 220. On the other hand, substantially semi-circular-shaped engagement notches 229 are formed in the upper edges of the two main sills 223 in FIG. 2. In the assembled state, a tip portion 231B of the shaft bar 231 of the sensor mechanism 230 described later is inserted into the two long holes 225 and 215. A shaft section 232 projecting sideways, externally fitted with a bearing, of the base portion 231A of the shaft bar 231 projecting in a T shape relative to the tip portion 231B of the shaft bar 31, as described later fits between the engagement notches 229.

A sensor base 235 of the sensor mechanism 230 described later is arranged in an intermediate portion 224 in the middle between the connecting section 211 of the anchor connecting member 210 and the main sills 223. In this intermediate portion 224, holes for screw insertion including screws B3 and B4 are formed, and two projections 224 are for positioning the sensor base 235 are formed.

The webbing connecting member 220 comprises, for example, a carbon steel sheet, and has a connecting section 221 connected to the webbing W at the upper end thereof. A hole 222 for insertion of the webbing W is pierced at a position near the upper end of the connection section 221.

Cavities 213 are formed on both sides in the width direction near the lower end (side opposite to the connecting section 1) of the webbing connecting member 210. Engagement sections 217 projecting to both sides are formed under these cavities 213. In the assembled state, these two engagement sections 217 engage slidably with the anchor connecting member 210 in the throughholes 227 of the above-mentioned anchor connecting member 210.

Furthermore, a long hole 215 is pierced in the center portion (between the two cavities 213 and the two engagement sections 217) of the webbing connecting member 220. In the assembled state, the tip portion 231B of the shaft bar 231 of the sensor mechanism 230 described later is inserted into this long hole 215.

In the webbing connecting member 220, a rap 220C is provided between the flat portion 220A formed by the connecting section 221 and the flat section 220B having the long hole 215 and the engagement section 217. As a result, the flat portion 220B slides along the surface of the anchor connecting member 210 serving as the base, and the flat portion 220A and the anchor connecting member 210 are positioned in the same plane, though there is a shift from the centers of the flat portion 220B are the anchor connecting member 210.

The sensor mechanism 230 has a shaft bar 231, a sensor base 235, a sensor plate 241, and an arm spring 245. The shaft bar 231 is a T-shaped member made (for example) of a zinc die-cast alloy, having a base portion 231A and a tip portion 231B. Shaft sections 232 projecting sideways are formed at both ends of the base portion 231A or the shaft bar 231. This shaft section 232 is externally equipped with a bearing 233 made (for example) of polyoxymethylene.

Two projections 231a are formed at the surface center of the base portion 231A of the shaft bar 231. The projection 231a is for positioning the arm spring 245, and engages with the hole of the arm spring 245. Threaded holes are formed on both sides, with the projection 231a of the base portion 231A of the shaft bar 231 in between. Screws B1 and B2 integrally joining the shaft bar 231 and the arm spring 245 are screwed in these threaded holes.

In the assembled state, the base portion 231A of the shaft bar 231 fits into the engagement notches of the two main sills 223 of the anchor connecting member 210 via a bearing 233 to complete installation. The tip 231B of the shaft bar 231 is inserted into the long hole 215 of the webbing connecting member 220 and the long hole 225 of the anchor connecting member 210. In this state, the shaft bar 231 is rotatable around the axial center of the base portion 231A (axial center of the shaft section 232 and the bearing 233) within the range of the long hole 215.

The sensor base 235 is a substantially U-shaped member made (for example) of an aluminum die-cast alloy. The sensor base 235 is positioned by a projection 224a on the surface of an intermediate section 224 of the anchor connecting member 210. A sensor plate 241 made (for example) of a stainless steel sheet is arranged on the surface of the sensor base 235. The sensor plate 241 has a fixed portion 241A under the notch 241C and an upper strain detection arm 241B on the notch 241C. The fixed portion 241A is positioned by the projection 235a on the sensor base 235. The strain detection arm 241B is arranged in a state installed at both ends of the U-shaped sensor base 235. Four strain gages are affixed to the strain detection arm 241B, and an ASIC (Application Specific Integrated Circuit, not shown) for converting a detection value of the strain gage into an electric signal is attached thereto. A point pin 243 is provided on the surface of the strain detection arm 241B.

An arm spring 245 is installed between the base portion 231A of the shaft bar 231 and the point pin 243 of the sensor plate 241. The arm spring 245 is a spring sheet made (for example) of stainless steel, and has a fixed portion 245A and an extending portion 245B extending downward diagonally from this fixed portion 245A. The tip of the extending portion 245B forms a contact point 245C. Two inner holes engaging with the projection 231a of the base portion 231A of the shaft bar 31 and two outer holes for insertion of the screws B1 and B2 are formed in the fixed portion 245A. The arm spring 45 is screw-fixed by tightening the screws B1 and B2 in the state positioned by the projection 31a of the base portion 231A of the shaft bar 231. In a state in which the fixed portion 245A is fixed, the contact point 245C hits the tip of the point pin 243 of the sensor plate 241.

Operation of the seat belt tension meter having the above-mentioned configuration will now be described. As shown in FIG. 3, when no tension is applied to the webbing W, the tip 231B of the shaft bar 231 of the sensor mechanism 230 is in an upright state relative to the anchor connecting member 210 and the webbing connecting member 220. In this case, the lower end edge of the engagement section 217 of the webbing connecting member 220 is located at the lower end in the throughhole 227 of the anchor connecting member 210, and a gap X is maintained between the upper end edge of the engagement section 217 and the upper end of the throughhole 227. The arm spring 245 of the sensor mechanism 230 keeps its original shape. The tip of the shaft bar 231 is inserted substantially straight into the long hole 215 of the webbing connecting member 220.

When a tension is applied to the webbing W from this state, the webbing connecting member 220 is pulled upward. Then, the long hole 215 of the webbing connecting member 220 hits the shaft bar 231 of the sensor mechanism 230, and a force acts upward on the tip 231B of the shaft bar 231 with the webbing connecting member 220 as the force point. As a result, the shaft bar 231 rotates in the engagement notch 229 of the main sill 223 of the webbing connecting member 220, with the bearing 233 externally provided on the shaft section 232 of the base portion 231A.

When the shaft bar 231 rotates, the arm spring 245 fixed thereto moves in conjunction therewith, and as shown in FIG. 4, the extending portion 245B is bent and deforms. Upon this bending deformation, the arm spring 245 is in a state in which the arm spring 245 is supported between a fixed portion 245A (fixed end) fixed to the base portion 231A of the shaft bar 231 and the contact point 45C (free end) in contact with the point pin 243 of the sensor plate 241, and this force is transmitted to the point pin 243.

When the force is transmitted to the point pin 243, a strain is generated in the strain detection arm 241B of the sensor plate 241. This strain is detected by the strain gage, and this detection value is converted into an electric signal by the ASIC for measurement (step S6).

The amount of relative displacement between the webbing connecting member 220 and the anchor connecting member 210 is limited within the range of the gap X. As shown in FIG. 4, the maximum displacement is reached when the engagement section 217 of the webbing connecting member 220 hits the lower end of the throughhole 227 of the anchor connecting member 210, and the force acting on the webbing connecting member 220 is transmitted directly to the anchor connecting member 210. The transmitted load (stopper load) in this case is about 20 kg. By thus limiting the amount of displacement, the load acting on the sensor plate 241 is also limited.

In the above-mentioned load measuring state, the flat portion 220A which is the portion receiving the tensile force in the webbing connecting member 220 is on the same plane as the anchor connecting member 210. Therefore, even when a tensile force acts between them, no rotational moment is produced. As a result, no compound force acts between the anchor connecting member 210 and the webbing connecting member 220, and the tension is smoothly transmitted to the shaft bar 231. It is thus possible to accurately measure the tension.

Comparison of the distance between the end of the hole 222 of the webbing connecting member 220 serving as the force point and the distance between the contact points of the long hole 215 and the shaft bar 231 suggests the following fact. It is x1 in FIG. 29 illustrating an embodiment of the prior device, and x2 in FIG. 29 illustrating the embodiment of the present invention, clearly showing that x1>x2. This is due to the fact that, in the present invention, the sensor mechanism 230 is mounted on the anchor connecting member 210. Therefore, even when the seat belt (webbing) inclines relative to the webbing connecting member 220, the resulting moment is smaller in the present invention, thus making it possible to reduce the compound force.

In the embodiments described above, the anchor connecting member 210 has been used as the base plate, and the sensor mechanism has been attached thereto. As in the prior device, however, the webbing connecting member 220 may be used as the base plate. The sensor mechanism may be attached thereto, and a ramp may be provided for the anchor plate 210 so that the surface on which the anchor connecting member is fixed to the vehicle body and the surface on which the webbing connecting member is connected to the seat belt are in the same plane. In this case, no effect is available to reduce the compound force caused by a relative inclination of the webbing connecting member 220 and the seat belt (webbing). However, because of the shift between the webbing connecting member 220 surface and the anchor connecting member 210 surface, it is possible to prevent occurrence of a compound force.

While specific embodiments have been described in detail in the foregoing detailed description and illustrated in the accompanying drawings, those with ordinary skill in the art will appreciate that various modifications and alternatives to those details could be developed in light of the overall teachings of the disclosure. For example, rather than bunching or folding a portion of the webbing, the webbing may be woven so as to locally narrow that portion, wherein the warp fibers are bunched together in the narrowed portion of the webbing and the associated weft fibers are interlaced therewith accordingly. Furthermore, the friction and associated hysteresis between webbing and the seat belt tension sensor may be reduced by interposing a relatively low friction coating or material at a location of sliding contact between the webbing and the seat belt tension sensor. Accordingly, the particular arrangements disclosed are meant to be illustrative only and not limiting as to the scope of the invention, which is to be given the full breadth of the appended claims and any and all equivalents thereof.

What is claimed is:

1. A seat belt assembly including a belt tension sensor, comprising:
   a connecting member for connecting the sensor to a vehicle body,
   a carriage of the belt tension sensor, wherein the carriage is adapted to engage a webbing of a seat belt and said carriage is adapted to move within a housing in opposition to at least one spring acting between the housing and the carriage, whereby the amount of movement is responsive to a tension in the seat belt, said carriage comprising:
   a. an opening adapted to receive the webbing of the seat belt, wherein said opening cooperates with a corresponding opening in the housing; and
   b. a protrusion extending from said carriage, wherein with said carriage is installed in the seat belt tension sensor, said protrusion extends beyond an outer surface bounding the housing and spanning across the opening in the housing; and wherein the portion of the webbing inserted into the opening is folded back from the both sides in the width direction, and the width is reduced by stitching the folded portion with the portion not folded.

2. The assembly of claim 1, wherein said protrusion comprises at least one flange.

3. The assembly of claim 2, wherein said opening in said carriage is sufficiently narrower than said corresponding opening in the housing so as to prevent said webbing from rubbing against a side of said corresponding opening in the housing responsive to a tension load applied to said webbing.

4. The assembly of claim 1, wherein said protrusion comprises a thimble portion.

5. The assembly of claim 4, wherein said thimble portion comprises a groove, said groove is adapted to receive a portion of said webbing of said seat belt, and said thimble portion and said groove are adapted to prevent said webbing from contacting a side of said opening in the housing responsive to a tension load applied to said webbing.

6. The assembly of claim 4, wherein said thimble portion comprises a groove, said groove is adapted to receive a portion of said webbing of said seat belt, and said thimble portion and said groove are adapted to prevent said webbing from contacting a surface of the housing responsive to a tension load applied to said webbing.

* * * * *